(12) United States Patent
Baek et al.

(10) Patent No.: US 12,497,626 B2
(45) Date of Patent: Dec. 16, 2025

(54) VARIANT DIHYDRODIPICOLINATE REDUCTASE POLYPEPTIDE AND METHOD OF PRODUCING L-THREONINE USING THE SAME

(71) Applicant: CJ CHEILJEDANG CORPORATION, Seoul (KR)

(72) Inventors: Mina Baek, Seoul (KR); Su Yon Kwon, Seoul (KR); Imsang Lee, Seoul (KR); Seung-ju Son, Seoul (KR); Kwang Woo Lee, Seoul (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 560 days.

(21) Appl. No.: 17/623,231

(22) PCT Filed: Aug. 6, 2020

(86) PCT No.: PCT/KR2020/010419
§ 371 (c)(1),
(2) Date: Dec. 27, 2021

(87) PCT Pub. No.: WO2021/060696
PCT Pub. Date: Apr. 1, 2021

(65) Prior Publication Data
US 2022/0356480 A1   Nov. 10, 2022

(30) Foreign Application Priority Data

Sep. 26, 2019  (KR) .................. 10-2019-0119159

(51) Int. Cl.
| | | |
|---|---|---|
| *C12N 15/77* | (2006.01) | |
| *C12N 9/02* | (2006.01) | |
| *C12N 9/06* | (2006.01) | |
| *C12N 9/88* | (2006.01) | |
| *C12P 13/08* | (2006.01) | |

(52) U.S. Cl.
CPC .......... *C12N 15/77* (2013.01); *C12N 9/0004* (2013.01); *C12N 9/0016* (2013.01); *C12N 9/0093* (2013.01); *C12N 9/88* (2013.01); *C12P 13/08* (2013.01); *C12Y 103/01026* (2013.01); *C12Y 104/01016* (2013.01); *C12Y 117/01* (2013.01); *C12Y 401/0102* (2013.01); *C12Y 403/03007* (2015.07)

(58) Field of Classification Search
CPC .... C12N 15/77; C12N 9/0004; C12N 9/0016; C12N 9/0093; C12N 9/88; C12N 9/001; C12N 15/52; C12P 13/08; C12Y 103/01026; C12Y 104/01016; C12Y 117/01; C12Y 401/0102; C12Y 403/03007; C12R 2001/15

See application file for complete search history.

(56) References Cited

U.S. PATENT DOCUMENTS

| | | | |
|---|---|---|---|
| 8,048,650 B2 | 11/2011 | Koo et al. | |
| 2015/0197779 A1* | 7/2015 | Saville | C12P 13/12 435/254.2 |

FOREIGN PATENT DOCUMENTS

| | | | |
|---|---|---|---|
| CN | 107 916 246 A | 4/2018 | |
| EP | 3957725 A1 | 2/2022 | |
| KR | 10-2002-0065932 A | 8/2002 | |
| KR | 10-1512432 B1 | 4/2015 | |
| KR | 10-2017-0047642 A | 5/2017 | |
| KR | 10-2126951 B1 | 6/2020 | |
| WO | WO-0149854 A2 * | 7/2001 | ............. C07K 14/34 |

OTHER PUBLICATIONS

K Singh, Raushan, et al. "Protein engineering approaches in the post-genomic era." Current Protein and Peptide Science 19.1 (2018): 5-15. (Year: 2018).*

Zhang, Meiling, David A. Case, and Jeffrey W. Peng. "Propagated perturbations from a peripheral mutation show interactions supporting WW domain thermostability." Structure 26.11 (2018): 1474-1485. (Year: 2018).*

The English translation of the International Search report of PCT/KR2020/010419 mailed Nov. 17, 2020.

Xu et al., "Rational modification of Corynebacterium glutamicum dihydrodipicolinate reductase to switch the nucleotide-cofactor specificity for increasing L-lysine production", Biotechnology and Bioengineering, 2018, vol. 115, pp. 1764-1777; DOI: 10.1002/bit.26591.

Extended European Search Report of EP Application No. 20869104.8 dated Jul. 29, 2022, 7 pages.

* cited by examiner

*Primary Examiner* — Paul J Holland
*Assistant Examiner* — Erica Nicole Jones-Foster
(74) *Attorney, Agent, or Firm* — Squire Patton Boggs (US) LLP

(57) ABSTRACT

The present disclosure relates to a variant polypeptide having attenuated dihydrodipicolinate reductase activity and a method of producing L-threonine using the same.

16 Claims, No Drawings
Specification includes a Sequence Listing.

VARIANT DIHYDRODIPICOLINATE REDUCTASE POLYPEPTIDE AND METHOD OF PRODUCING L-THREONINE USING THE SAME

CROSS-REFERENCE TO RELATED APPLICATIONS

The present application is a 35 U.S.C. § 371 national-phase filing of International Application No. PCT/KR2020/010419, filed on Aug. 6, 2020, which claims the benefit of Korean Patent Application No. 10-2019-0119159, filed on Sep. 26, 2019, both of which applications are incorporated herein by reference in their entirety.

INCORPORATION BY REFERENCE

This application contains a sequence listing entitled "059520_00028_ST25.txt," being submitted herein in ASCII format via EFS-Web, which is a copy of the sequence listing as filed in PCT/KR2020/010419, which was modified on Nov. 29, 2021 and is 52,888 bytes in size.

TECHNICAL FIELD

The present disclosure relates to a variant polypeptide having attenuated dihydrodipicolinate reductase activity, and a method of producing L-threonine using the same.

BACKGROUND ART

A microorganism of the genus *Corynebacterium* (e.g., *Corynebacterium glutamicum*) is a gram-positive microorganism frequently used in the production of L-amino acids and other useful substances. To produce L-amino acids and other useful substances, various studies have been conducted to develop high-efficiency microorganisms and fermentation technology. For example, a target substance-specific approach, such as increasing expression of a gene encoding an enzyme involved in L-lysine biosynthesis or removing a gene unnecessary for L-lysine biosynthesis, has been mainly used (U.S. Pat. No. 8,048,650).

Meanwhile, among L-amino acids, L-lysine, L-threonine, L-methionine, L-isoleucine, and L-glycine are aspartate-derived amino acids, and effective conversion of aspartyl semialdehyde into homoserine may affect the synthesis level of L-threonine, in which aspartyl semialdehyde is a common precursor acting on biosynthesis branches from aspartate to L-lysine and other aspartate-derived amino acids.

Dihydrodipicolinate reductase is an enzyme acting in the lysine biosynthetic pathway in microorganisms, and is a key enzyme that acts immediately after dihydrodipicolinate synthase in the biosynthetic pathway of lysine from aspartyl semialdehyde which is a common precursor for threonine biosynthesis and lysine biosynthesis in microorganisms.

Diaminopimelate, a precursor for lysine biosynthesis, is used in the formation of peptidoglycan that is a microbial cell wall component. Thus, when the dapB gene encoding dihydrodipicolinate reductase acting in the diaminopimelate production pathway is deleted, microbial cell wall synthesis is inhibited, resulting in growth inhibition of strains.

Accordingly, in order to improve L-threonine-producing ability, rather than deleting the genes acting in the L-lysine biosynthetic pathway, it is necessary to reduce the genes to appropriate levels.

DISCLOSURE

Technical Problem

In view of this technical background, the present inventors have made many efforts to increase L-threonine production while reducing L-lysine production without delaying a growth rate of a strain. As a result, they found that when a novel variant polypeptide having dihydrodipicolinate reductase of which activity is attenuated at a specific level is used, the production of L-threonine is increased while maintaining growth of the microorganism, thereby completing the present disclosure.

Technical Solution

An, object of the present disclosure is to provide a variant dihydrodipicolinate reductase polypeptide derived from *Corynebacterium glutamicum*.

Another object of the present disclosure is to provide a polynucleotide encoding the variant polypeptide.

Still another object of the present disclosure is to provide a microorganism of the genus *Corynebacterium* including the variant dihydrodipicolinate reductase polypeptide.

Still another object of the present disclosure is to provide a method of producing L-threonine using the microorganism.

Still another object of the present disclosure is to provide use of the microorganism in producing L-threonine.

Advantageous Effects

When the novel variant polypeptide of the present disclosure, which has attenuated dihydrodipicolinate reductase activity, is used, it is possible to increase threonine production while reducing lysine production without delaying the growth rate, as compared with a wild-type strain having dihydrodipicolinate reductase activity, and therefore, the novel variant polypeptide may be widely applied to mass production of threonine.

BEST MODE FOR CARRYING OUT THE INVENTION

The present disclosure will be described in detail as follows. Meanwhile, each description and embodiment disclosed in the present disclosure may also be applied to other descriptions and embodiments. That is, all combinations of various elements disclosed in the present disclosure fall within the scope of the present disclosure. Further, the scope of the present disclosure is not limited by the specific description described below.

To achieve the above objects, one aspect of the present disclosure provides a variant dihydrodipicolinate reductase polypeptide derived from *Corynebacterium glutamicum*.

Specifically, the variant dihydrodipicolinate reductase polypeptide derived from *Corynebacterium glutamicum* is a polypeptide having dihydrodipicolinate reductase activity, wherein the polypeptide has, as a reference sequence to be mutated, the same sequence as that of dihydrodipicolinate reductase derived from *Corynebacterium glutamicum*, and includes substitution of one or more amino acids. More specifically, the variant dihydrodipicolinate reductase polypeptide includes the amino acid substitution, in which an amino acid at position 13 is substituted with another amino acid.

The variant dihydrodipicolinate reductase polypeptide may have the same sequence as the sequence of dihydrodipicolinate reductase derived from *Corynebacterium glutamicum*, and for example, it may be a variant polypeptide in which an amino acid at position 13 in an amino acid sequence of SEQ ID NO: 1 or an amino acid sequence having 98% or more identity thereto may be substituted with asparagine, threonine, cysteine, tyrosine, serine, lysine, or glutamine. For example, the present disclosure provides a variant polypeptide having dihydrodipicolinate reductase activity, in which the amino acid at position 13 in the amino acid sequence of SEQ ID NO: 1 or an amino acid sequence having 98% or more identity or homology thereto may be substituted with asparagine.

In particular, the amino acid sequence having 98% or more identity may consist of SEQ ID NO: 51. Further, the variant dihydrodipicolinate reductase polypeptide may consist of an amino acid sequence of SEQ ID NO: 3 or SEQ ID NO: 53.

In the present disclosure, the "dihydrodipicolinate reductase (Ec 1.3.1.26)" refers to an enzyme that catalyzes lysine biosynthesis by converting 2,3-dihydrodipicolinate into piperidine 2,6-dicarboxylate, which is a precursor for lysine biosynthesis, using NADPH, in which 2,3-dihydrodipicolinate is converted via dihydrodipicolinate synthase from aspartyl semialdehyde which is a common intermediate in the biosynthesis of L-methionine, L-threonine, L-isoleucine, and L-lysine which are aspartate-derived amino acids in microorganisms.

In the present disclosure, the dihydrodipicolinate reductase may be derived from any origin, as long as it is a polypeptide having the above conversion activity, and an enzyme derived from any organism (plants, microorganisms, etc.) may be used. Specifically, the dihydrodipicolinate reductase may have the same sequence as a sequence derived from a microorganism of the genus *Corynebacterium*, and more specifically may have the same sequence as a sequence derived from *Corynebacterium glutamicum*.

In the present disclosure, the dihydrodipicolinate reductase derived from *Corynebacterium glutamicum* means that it also includes the same sequence as the sequence of dihydrodipicolinate reductase derived from the microorganism.

For example, the sequence may be the sequence of SEQ ID. NO: 1 or a sequence having 98% or more identity or 99% or more identity thereto, but is not limited thereto. Such a sequence may be, for example, a polypeptide including an amino acid sequence of SEQ ID NO: 51.

The polypeptide including the amino acid sequence of SEQ ID NO: 1 or SEQ ID NO: 51 may be used interchangeably with a polypeptide having the amino acid sequence of SEQ ID NO: 1 or SEQ ID NO: 51 or a polypeptide consisting of the amino acid sequence of SEQ ID NO: 1 or SEQ ID NO: 51.

In the present disclosure, a method well known in the art may be applicable to a method of securing dihydrodipicolinate reductase. Examples of the method may include a gene synthesis technology including codon optimization to secure polypeptides with high efficiency from microorganisms of the genus *Corynebacterium*, which are commonly used in polypeptide expression, and a method of screening for useful enzyme resources by bioinformatics methods based on large amounts of genomic data of microorganisms, but are not limited thereto.

In the present disclosure, the "polypeptide having dihydrodipicolinate reductase activity" does not exclude addition of a meaningless sequence upstream or downstream the amino acid sequence of the polypeptide having dihydrodipicolinate reductase activity, for example, the amino acid sequence of SEQ ID NO: 1 or SEQ ID NO: 51, a naturally occurring mutation, or a silent mutation, and it is apparent to one of ordinary skill in the art that, as long as a protein has activity identical or corresponding to that of the polypeptide including the amino acid sequence of SEQ ID NO: 1 or SEQ ID NO: 51, it corresponds to the polypeptide of the present disclosure, which has dihydrodipicolinate reductase activity.

For specific example, the polypeptide of the present disclosure, which has dihydrodipicolinate reductase activity, may be a polypeptide including the amino acid sequence of SEQ ID NO: 1 or SEQ ID NO: 51 or an amino acid sequence having at least 60%, 70%, 80%, 83%, 84%, 85%, 86%, 87%, 88%, 89%, 90%, 91%, 92%, 93%, 94%, 95%, 97%, 98%, or 99% homology or identity thereto. Additionally, it is obvious that any polypeptide having an amino acid sequence with deletion, modification, substitution, or addition in part of the sequence, in addition to the amino acid at position 13, may also be included within the scope of the present disclosure, as long as the amino acid sequence has the homology or identity described above and exhibits biological activity corresponding to that of the polypeptide.

For example, the polypeptide of the present disclosure, which has dihydrodipicolinate reductase activity, may be dihydrodipicolinate reductase derived from *Corynebacterium glutamicum*. More specifically, the polypeptide may have the amino acid sequence (SEQ ID NO: 1) of dihydrodipicolinate reductase derived from *Corynebacterium glutamicum* ATCC13032 or the amino acid sequence (SEQ ID NO: 51) of dihydrodipicolinate reductase derived from *Corynebacterium glutamicum* ATCC13869. These dihydrodipicolinate reductases having the sequences above may show homology or identity to each other, and exhibit corresponding efficacy as dihydrodipicolinate reductase, and therefore, it is apparent that the above dihydrodipicolinate reductases are included in the polypeptide of the present disclosure, which has dihydrodipicolinate reductase activity.

The "homology" or "identity" refers to a percentage of identity between two given polynucleotides or polypeptide moieties, and refers to a degree of matching with two given amino acid sequences or nucleotide sequences, and may be expressed as a percentage. The terms "homology" and "identity" may often be used interchangeably with each other. In the present disclosure, a homology sequence having activity identical or similar to that of a given amino acid sequence or nucleotide sequence is expressed as "% homology". Sequence homology from one moiety to another moiety may be determined by a known technique in the art. For example, homology may be confirmed using a standard software for calculating parameters such as score, identity, and similarity, specifically, BLAST 2.0 or by comparing the sequences via Southern hybridization experiments under defined stringent conditions, and the defined appropriate hybridization conditions may be determined by a method well known to one of ordinary skill in the art within the scope of the corresponding technology (e.g., J. Sambrook et al., Molecular Cloning, A Laboratory Manual, $2^{nd}$ Edition, Cold Spring Harbor Laboratory press, Cold Spring Harbor, New York, 1989; F. M. Ausubel et al., Current Protocols in Molecular Biology, John Wiley & Sons, Inc., New York).

As used herein, the term "modification", "variant", or "mutant" refers to a culture product or individual subject which genetically or non-genetically exhibits a stable phenotypic change, and specifically refers to a variant in which one or more amino acids of the amino acid sequence corresponding to the polypeptide having dihydrodipicolinate reductase activity are modified, and thus the activity is attenuated as compared with that of its wild-type, natural, or non-modified type.

As used herein, the variant dihydrodipicolinate reductase polypeptide may be used interchangeably with "variant dihydrodipicolinate reductase", "modified dihydrodipicolinate reductase", "dihydrodipicolinate reductase variant", "mutant dihydrodipicolinate reductase", or "dihydrodipicolinate reductase mutant". Meanwhile, these variants may be non-naturally occurring.

As used herein, the term "modification" refers to a common method for improving enzymes, and any methods known in the art may be used without limitation, including strategies such as rational design, directed evolution, etc. For example, the strategies for rational design include a method of specifying an amino acid at a particular position (site-directed mutagenesis or site-specific mutagenesis), etc., and the strategies for directed evolution include a method of inducing random mutagenesis, etc. Additionally, the modification may be one induced by natural mutation without external manipulation. Specifically, the variant dihydrodipicolinate reductase polypeptide may be an isolated polypeptide, a recombinant polypeptide, or a non-naturally occurring polypeptide, but is not limited thereto.

The "variant dihydrodipicolinate reductase polypeptide" of the present disclosure is a polypeptide having dihydrodipicolinate reductase activity, the polypeptide including substitution of one or more amino acids, wherein the amino acid substitution includes substitution of an amino acid at position 13 with another amino acid.

The "substitution with another amino acid" is not limited, as long as the substitution is substitution with an amino acid different from the amino acid before substitution. Specifically, the substitution may be substitution with any one amino acid selected from lysine, histidine, glutamic acid, aspartic acid, glycine, alanine, valine, leucine, isoleucine, methionine, phenylalanine, tryptophan, proline, serine, threonine, cysteine, tyrosine, asparagine, and glutamine. More specifically, the variant dihydrodipicolinate reductase polypeptide may be a polypeptide, in which an amino acid at position 13 in the amino acid sequence of SEQ ID NO: 1 or an amino acid sequence having 98% or more identity thereto may be substituted with a polar amino acid or a basic amino acid.

More specifically, the variant dihydrodipicolinate reductase polypeptide may be a variant polypeptide, in which an amino acid at position 13 in the amino acid sequence of SEQ ID NO: 1 or an amino acid sequence having 98% or more identity thereto may be substituted with asparagine, threonine, cysteine, tyrosine, serine, lysine, or glutamine.

Further, the substituted amino acid residue may include natural amino acids as well as non-natural amino acids. The non-natural amino acids may include, for example, D-amino acids, homo-amino acids, beta-homo-amino acids, N-methyl amino acids, alpha-methyl amino acids, unusual amino acids (e.g., citrulline or naphthylalanine, etc.), but are not limited thereto. Meanwhile, in the present disclosure, when "a specific amino acid is substituted" is expressed, it is obvious that the amino acid is substituted with an amino acid different from the amino acid before the substitution, unless otherwise indicated.

In a specific embodiment, the present disclosure may provide a variant polypeptide having dihydrodipicolinate reductase activity, wherein an amino acid at position 13 in the amino acid sequence of SEQ ID NO: 1 or an amino acid sequence having 98% or more identity thereto is substituted with asparagine. In particular, the amino acid sequence having 98% or more identity may consist of SEQ ID NO: 51.

As used herein, the term "corresponding to" refers to an amino acid residue at the position listed in a protein or peptide, or an amino acid residue similar to, identical to, or homologous to a residue listed in another protein or peptide. As used herein, "corresponding region" generally refers to a similar position in a related protein or a reference protein.

In the present disclosure, a specific numbering of amino acid residue positions in the polypeptide used in the present disclosure may be employed. For example, by aligning the polypeptide sequence of the present disclosure with a target polypeptide to be compared, it is possible to designate an amino acid position number corresponding to any amino acid residue in the polypeptide of the present disclosure.

The variant dihydrodipicolinate reductase provided in the present disclosure may have increased L-threonine-producing ability by substituting an amino acid at a specific position in the above-described dihydrodipicolinate reductase, as compared with the polypeptide before modification. The variant polypeptide may include substitution of an amino acid at the position corresponding to the position 13 in the amino acid sequence of SEQ ID NO: 1 with asparagine or an amino acid sequence having 98% or more identity thereto; may have at least 80%, 90%, 95%, 96%, 97%, 98%, or 99% or more, and less than 100% sequence homology to the amino acid sequence of SEQ ID NO: 1 or the amino acid sequence of SEQ ID NO: 51; and may have dihydrodipicolinate reductase activity.

The dihydrodipicolinate reductase activity of the variant polypeptide may be attenuated, as compared with the dihydrodipicolinate reductase activity of the wild-type amino acid sequence of SEQ ID NO: 1 or the amino acid sequence having 98% or more identity thereto.

For specific example, the variant dihydrodipicolinate reductase of the present disclosure may be a polypeptide including the amino acid sequence of SEQ ID NO: 3 or SEQ ID NO: 53 or an amino acid sequence having homology or identity thereto. Further, it is obvious that any polypeptide having an amino acid sequence with deletion, modification, substitution, or addition in part of the sequence, in addition to the amino acid at position 13, may also be included within the scope of the present disclosure, as long as the amino acid sequence has such homology or identity and exhibits biological activity corresponding to that of the polypeptide.

Further, the variant dihydrodipicolinate reductase polypeptide of the present disclosure may be characterized by having attenuated activity for producing a final product (i.e., lysine) in a microorganism including the same, unlike a wild-type, natural polypeptide, or non-modified polypeptide having dihydrodipicolinate reductase activity.

As used herein, the "attenuated" means that the function of the protein or polypeptide is reduced, and due to the attenuated dihydrodipicolinate reductase activity, the function in the biosynthesis of lysine from aspartyl semialdehyde which is a common precursor for threonine biosynthesis and lysine biosynthesis is reduced, and as a result, the ability to produce the final product (i.e., lysine) is reduced whereas the ability to produce threonine is increased, thereby increasing productivity of threonine and threonine-derived amino acids. The threonine-derived amino acids refer to amino acids which may be synthesized using threonine as a precursor, and any material may be used without limitation as long as it can be synthesized from threonine.

Further, in the present disclosure, since the function of dihydrodipicolinate reductase is not inhibited but attenuated, there is no problem in producing diaminopimelate which is a precursor for lysine biosynthesis, and thus cell wall synthesis of microorganisms is not inhibited, and there is no problem in growth of the microorganisms. In other words, the activity may be attenuated at an appropriate level not by deleting the gene (dapB) encoding dihydrodipicolinate reductase but by the modification of substituting the amino acid at position 13 with another amino acid.

Another aspect of the present disclosure provides a polynucleotide encoding the variant dihydrodipicolinate reductase polypeptide.

The variant dihydrodipicolinate reductase polypeptide is the same as described above.

As used herein, the term "polynucleotide" refers to a DNA or RNA strand having a predetermined length or more, which is a long chain polymer of nucleotides formed by linking nucleotide monomers via covalent bonds, and a nucleotide which is a basic unit thereof includes natural nucleotides as well as analogues having a modified sugar or base moiety. In the present disclosure, the polynucleotide may be a polynucleotide isolated from cells or a polynucleotide artificially synthesized, but is not limited thereto.

Specifically, the polynucleotide may be a polynucleotide encoding the variant dihydrodipicolinate reductase polypeptide. The polynucleotide encoding the variant polypeptide of the present disclosure may include any polynucleotide sequence without limitation, as long as it is a polynucleotide sequence encoding the variant polypeptide of the present disclosure, which has dihydrodipicolinate reductase activity. For specific example, the polynucleotide encoding the variant polypeptide of the present disclosure may be a polynucleotide including a nucleotide sequence of SEQ ID NO; 4 or SEQ ID NO: 54, or a nucleotide sequence having at least 60%, 70%, 80%, 83%, 84%, 85%, 86%, 87%, 88%, 89%, 90%, 91%, 92%, 93%, 94%, 95%, 97%, 98%, or 99% homology or identity thereto. Further, it is obvious that any polynucleotide having a nucleotide sequence with deletion, modification, substitution, or addition in part of the sequence, in addition to the nucleotide sequence encoding the amino acid at position 13, may also be included within the scope of the present disclosure, as long as the nucleotide sequence encodes the amino acid sequence having such homology or identity and exhibiting biological activity corresponding to that of the dihydrodipicolinate reductase polypeptide.

In the present disclosure, the polynucleotide encoding the amino acid sequence of the variant dihydrodipicolinate reductase may be specifically derived from a microorganism of the genus *Corynebacterium*, and more specifically derived from *Corynebacterium glutamicum*, but is not limited thereto.

Based on the genetic code degeneracy, nucleotide sequences encoding the same amino acid sequence and variants thereof may also be included in the scope of the present disclosure. Specifically, the polynucleotide encoding the polypeptide having dihydrodipicolinate reductase activity may include any polynucleotide without limitation, as long as it has dihydrodipicolinate reductase activity, because various modifications may be made in the coding region provided that they do not change the amino acid sequence of the polypeptide, due to codon degeneracy or in consideration of the codons preferred by the organism in which the polypeptide is to be expressed.

Further, the polynucleotide encoding the protein variant may include a probe which may be produced from a known gene sequence, for example, any probe without limitation as long as it includes a sequence which hybridizes with a complementary sequence to all or part of the polynucleotide sequence under stringent conditions to encode the polypeptide having activity of the polypeptide consisting of the amino acid sequence of the above SEQ ID NO.

The term "stringent conditions" mean conditions under which specific hybridization between polynucleotides is allowed. Such conditions are described in detail in a literature (e.g., J. Sambrook et al., Molecular Cloning, A Laboratory Manual, 2nd Edition, Cold Spring Harbor Laboratory press, Cold Spring Harbor, New York, 1989; F. M. Ausubel et al., Current Protocols in Molecular Biology, John Wiley & Sons, Inc., New York) which is well-known to one of ordinary skill in the art. For example, the stringent conditions may include conditions under which genes having high homology (i.e., 80%, 90% or higher, more specifically 95% or higher, much more specifically 97% or higher, particularly specifically 99% or higher homology) are hybridized with each other and genes having homology lower than the above homology are not hybridized with each other, or ordinary washing conditions of Southern hybridization, i.e., washing once, specifically, twice or three times at a salt concentration and a temperature corresponding to 60° C. 1×SSC, 0.1% SDS, specifically, 60° C. 0.1×SSC, 0.1% SDS, and more specifically 68° C. 0.1×SSC, 0.1% SDS. Hybridization requires that the two nucleic acids contain complementary sequences, although mismatches between bases are possible depending on the stringency of the hybridization.

As used herein, the term "complementary" is used to describe the relationship between nucleotide bases which may hybridize with each other. For example, with respect to DNA, adenosine is complementary to thymine, and cytosine is complementary to guanine. Accordingly, the present disclosure may include not only the substantially similar nucleotide sequences but also isolated nucleotide fragments which are complementary to the entire sequence. Specifically, the polynucleotide having homology may be detected using hybridization conditions including the hybridization at a Tm value of 55° C. and the conditions described above. Additionally, the Tm value may be 60° C., 63° C., or 65° C., but is not limited thereto, and may be appropriately controlled by one of ordinary skill in the art according to the purposes. Appropriate stringency for the hybridization of polynucleotides depends on the length and degree of complementarity of the polynucleotides, and the variables are well-known in the art (see Sambrook et al., supra, 9.50-9.51, 11.7-11.8).

Still another aspect of the present disclosure provides a vector including the polynucleotide encoding the variant polypeptide.

As used herein, the term "vector" refers to a DNA construct that includes a nucleotide sequence of a polynucleotide encoding a target polypeptide operably linked to an appropriate regulatory sequence to enable expression of the target polypeptide in an appropriate host cell. The regulatory sequence may include a promoter capable of initiating transcription, any operator sequence for the regulation of such transcription, a sequence encoding an appropriate mRNA ribosome-binding domain, and a sequence regulating termination of transcription and translation. After the vector is transformed into the appropriate host cell, it may replicate or function independently of the host genome, and may be integrated into the genome itself.

The vector used in the present disclosure is not particularly limited, as long as it is able to replicate in the host cell, and any vector known in the art may be used. Examples of commonly used vectors may include a natural or recombinant plasmid, cosmid, virus, and bacteriophage. For instance, pWE15, M13, MBL3, MBL4, IXII, ASHII, APII, t10, t11, Charon4A, Charon21A, etc. may be used as a phage vector or cosmid vector. pBR type, pUC type, pBluescriptII type, pGEM type, pTZ type, pCL type, pET type, etc. may be used as a plasmid vector. Specifically, pDZ, pACYC177, pACYC184, pCL, pECCG117, pUC19, pBR322, pMW118, pCC1BAC vector, etc. may be used, but is not limited thereto.

The vector applicable in the present disclosure is not particularly limited, and any known expression vector may be used. Further, a polynucleotide encoding a target polypeptide may be inserted into the chromosome using a vector for intracellular chromosomal insertion. The chromosomal insertion of the polynucleotide may be performed by any method known in the art, for example, homologous recombination, but is not limited thereto. A selection marker to confirm the chromosomal insertion may be further included. The selection marker is to select cells transformed with the vector, that is, to confirm insertion of the target nucleic acid molecule, and the selection marker may include markers providing selectable phenotypes, such as drug resistance, auxotrophy, resistance to cytotoxic agents, or expression of surface proteins. Since only cells expressing the selection marker are able to survive or to show different phenotypes under the environment treated with a selective agent, the transformed cells may be selected.

Still another aspect of the present disclosure is to provide a transformant into which the vector is introduced.

As used herein, the term "transformation" means the introduction of a vector including a polynucleotide encoding a target polypeptide into a host cell in such a way that the polypeptide encoded by the polynucleotide is expressed in the host cell. As long as the transformed polynucleotide may be expressed in the host cell, it does not matter whether the transformed polynucleotide may be integrated into and placed in the chromosome of the host cell, or it may exist extrachromosomally. Further, the polynucleotide includes DNA and RNA encoding the target polypeptide. The polynucleotide may be introduced in any form, as long as it may be introduced into the host cell and expressed therein. For example, the polynucleotide may be introduced into the host cell in the form of an expression cassette, which is a gene construct including all elements required for its autonomous expression. Commonly, the expression cassette may include a promoter operably linked to the polynucleotide, transcriptional termination signals, ribosome binding sites, and translation termination signals. The expression cassette may be in the form of a self-replicable expression vector. Additionally, the polynucleotide as it is may be introduced into the host cell and operably linked to sequences required for expression in the host cell, but is not limited thereto. The transformation method includes any method of introducing a nucleic acid into a cell, and may be performed by selecting a suitable standard technique known in the art, depending on the host cell. For example, the method may include electroporation, calcium phosphate ($Ca(H_2PO_4)_2$, $CaHPO_4$, or $Ca_3(PO_4)_2$) precipitation, calcium chloride ($CaCl_2$) precipitation, microinjection, a polyethyleneglycol (PEG) method, a DEAE-dextran method, a cationic liposome method, a lithium acetate-DMSO method, etc., but is not limited thereto.

As used herein, the term "operably linked" means a functional linkage between a promoter sequence, which initiates and mediates transcription of the polynucleotide encoding the target polypeptide of the present disclosure, and the polynucleotide sequence. The operable linkage may be prepared using a gene recombinant technique known in the art, and site-specific DNA cleavage and linkage may be prepared using enzymes for cleavage and ligation known in the art, etc., but is not limited thereto.

Still another aspect of the present disclosure provides a microorganism including the variant dihydrodipicolinate reductase, and specifically an L-threonine-producing microorganism of the genus *Corynebacterium*, which includes the variant dihydrodipicolinate reductase polypeptide.

The variant dihydrodipicolinate reductase polypeptide is the same as described above.

As used herein, the term "microorganism" includes all of a wild-type microorganism and a naturally or artificially genetically modified microorganism, and it is a concept including all of the microorganisms in which a particular mechanism is attenuated or enhanced due to insertion of an exogenous gene, or enhancement or attenuation of activity of an endogenous gene.

As used herein, the term "threonine" may be used interchangeably with "L-threonine", and "lysine" may be used interchangeably with "L-lysine".

Specifically, the microorganism including the variant dihydrodipicolinate reductase polypeptide of the present disclosure means a microorganism that naturally has L-amino acid-producing ability or a microorganism obtained by providing the L-amino acid-producing ability for a parent strain having no L-amino acid-producing ability. Specifically, the microorganism including the dihydrodipicolinate reductase may be a microorganism expressing the variant dihydrodipicolinate reductase in which the amino acid at position 13 of the amino acid sequence of SEQ ID NO: 1 or SEQ ID NO: 51 is substituted with asparagine, threonine, cysteine, tyrosine, serine, lysine, or glutamine. For specific example, the microorganism may be a microorganism expressing the variant dihydrodipicolinate reductase in which the amino acid at position 13 of the amino acid sequence (i.e., arginine) is substituted with asparagine, but is not limited thereto.

The microorganism includes the variant dihydrodipicolinate reductase polypeptide, in which the amino acid at position 13 is substituted, and thus the microorganism is characterized by showing the increased threonine production while showing the reduced lysine production without interfering with growth thereof.

The activity of the dihydrodipicolinate reductase enzyme is attenuated by the mutation site, thereby increasing threonine production while reducing lysine production without delaying the growth rate of the strain.

The microorganism including the variant dihydrodipicolinate reductase of the present disclosure may have the reduced lysine-producing ability and the increased threonine-producing ability, as compared with a wild-type or non-modified microorganism including the polypeptide having dihydrodipicolinate reductase activity, and therefore, threonine may be obtained from the microorganism in a high yield.

In the present disclosure, the microorganism including the variant dihydrodipicolinate reductase polypeptide is not limited to a particular type, but it may be a microorganism of the genus *Enterobacter*, the genus *Escherichia*, the genus *Erwinia*, the genus *Serratia*, the genus *Pseudomonas*, the genus *Providencia*, the genus *Corynebacterium*, and the genus *Brevibacterium*. More specifically, the microorganism may be a microorganism of the genus *Corynebacterium*.

As used herein, the "microorganism of the genus *Corynebacterium*" may be specifically *Corynebacterium glutamicum*, *Corynebacterium ammoniagenes*; *Brevibacterium lactofermentum*, *Brevibacterium flavum*, *Corynebacterium thermoaminogenes*, *Corynebacterium efficiens*, etc., but is not limited thereto. For specific example, in the present disclosure, the microorganism of the genus *Corynebacterium* may be *Corynebacterium glutamicum*.

The microorganism may be a microorganism, which includes the polynucleotide encoding the variant dihydrodipicolinate reductase polypeptide, or a microorganism into which the vector including the polynucleotide encoding the variant dihydrodipicolinate reductase is introduced. Specifically, the introduction may be performed by transformation, but is not limited thereto. With respect to the objects of the present disclosure, the host cell or microorganism may be any microorganism as long as it includes the variant polypeptide to produce lysine or threonine or to produce amino acids derived from the amino acid (i.e., lysine or threonine).

In the microorganism of the genus *Corynebacterium*, specifically, expression of the thrC gene encoding threonine synthase, the ppc gene encoding phosphoenolpyruvate carboxylase, the galP gene involved in glucose uptake, the lysC gene encoding lysine-sensitive aspartokinase 3, the hom gene encoding homoserine dehydrogenase, or the pyc gene inducing an increase of oxaloacetate pool may be enhanced or increased in order to enhance the L-threonine biosynthetic pathway.

To release feedback inhibition of L-threonine, genetic modification may be introduced into, for example, the lysC gene, hom gene, or thrA gene having bifunctional aspartokinase/homoserine dehydrogenase 1.

To inactivate the genes that attenuate the L-threonine biosynthetic pathway, for example, expression of the pckA gene involved in conversion of oxaloacetate (OAA), which is an intermediate for L-threonine biosynthesis, into phosphoenolpyruvate (PEP), the tyrR gene repressing the lysC gene, the galR gene repressing expression of the galP gene involved in glucose uptake, or the mcbR gene which is a DNA-binding transcriptional dual regulator may be attenuated or inactivated in the microorganism.

To increase the activity of an L-threonine operon, expression of the threonine operon in the microorganism may be increased by introducing, into the microorganism, a plasmid including a threonine operon (Japanese Patent Publication No. 2005-227977), which consists of genes encoding aspartokinase, homoserine dehydrogenase, homoserine kinase, and threonine synthase, or an *E. coli*-derived threonine operon (TURBA E, et al, Agric. Biol. Chem. 53:2269~2271, 1989).

Further, the microorganism may be provided with resistance to α-amino-β-hydroxy valeric acid or D,L-threonine hydroxamate, which is an L-threonine analogue.

Further, the dapA gene (dihydrodipicolinate synthase), lysA gene (diaminopimelate decarboxylase), or ddh gene (diaminopimelate dehydrogenase), which acts in the biosynthetic pathway of L-lysine having a common precursor with L-threonine, may also be attenuated.

However, the microorganism is not limited thereto, and its L-threonine producing ability may be enhanced by a gene expression regulation method known in the art.

As used herein, the term "enhancement/increase" is a concept including increased activity as compared with intrinsic activity.

Such enhancement or increase of the gene activity may be achieved by applying various methods well known in the art. Examples of the method may include any one or more methods selected from the group consisting of a method of increasing the intracellular copy number of the gene; a method of introducing a modification in the expression regulatory sequence of the gene; a method of substituting the gene expression regulatory sequence with a sequence having strong activity; a method of introducing an additional modification into the corresponding gene to enhance the activity of the gene; and a method of introducing a foreign gene into a microorganism, or a combination thereof, but is not particularly limited thereto.

As used herein, the term "inactivation" is a concept including attenuated or eliminated activity as compared with intrinsic activity.

Such inactivation or attenuation of the gene activity may be achieved by applying various methods well known in the art. Examples of the method may include any one or more methods selected from the group consisting of a method of deleting the entirety or part of a gene on the chromosome, including the case where the activity of the gene is eliminated; a method of replacing the gene encoding the polypeptide on the chromosome with a gene mutated to reduce the polypeptide activity; a method of introducing a modification into an expression regulatory sequence of the gene encoding the polypeptide on the chromosome; a method of replacing an expression regulatory sequence of the gene encoding the polypeptide with a sequence having weak activity or no activity (e.g., a method of replacing the gene promoter with a promoter weaker than the endogenous promoter); a method of deleting the entirety or part of the gene encoding the polypeptide on the chromosome; a method of introducing an antisense oligonucleotide (e.g., antisense RNA) that binds complementarily to the transcript of the gene on the chromosome to inhibit the translation of the mRNA into the protein; a method of artificially adding a sequence complementary to the SD sequence the upstream of the SD sequence of the gene encoding the polypeptide to form a secondary structure, thereby making the adhesion of ribosome impossible; and a method of reverse transcription engineering (RTE), which adds a promoter to the 3'-end of the open reading frame (ORF) of the corresponding sequence so as to be reverse-transcribed, or a combination thereof, but are not particularly limited thereto.

For example, a method of increasing the intracellular copy number of the lysC, hom, or pyc gene to enhance activity of the gene; a method of introducing a modification into the expression regulatory sequence of the gene; a method of replacing the gene expression regulatory sequence with a sequence having strong activity; a method of introducing an additional modification into the corresponding gene to enhance the activity of the gene; and a method of introducing a foreign gene into a microorganism may be achieved, but the methods are not particularly limited thereto, and for enhancement or increase of the activity, a known method may be used without limitation.

For example, to attenuate the activity of the dapA, ddh, or lysA gene, a method of deleting the entirety or part of the gene on the chromosome, including the case where the activity of the gene is eliminated; a method of replacing the gene encoding the polypeptide on the chromosome with a gene mutated to reduce activity of the corresponding polypeptide; a method of introducing a modification into an expression regulatory sequence of the gene encoding the polypeptide on the chromosome; a method of replacing an expression regulatory sequence of the gene encoding the polypeptide with a sequence having weak activity or no activity (e.g., a method of replacing the gene promoter with a promoter weaker than the endogenous promoter); a method of deleting the entirety or part of the gene encoding the polypeptide on the chromosome may be performed, but the methods are not limited thereto, and for attenuation of the activity, a known method may be used without limitation.

Further, the microorganism including the variant dihydrodipicolinate reductase polypeptide may further include any one or more of the following variant polypeptides.

The variant polypeptides to be further included may include any one or more selected from a variant dihydrodipicolinate synthase polypeptide in which an amino acid at position 119 of an amino acid sequence of SEQ ID NO: 80 (i.e., tyrosine) is substituted with phenylalanine, a variant diaminopimelate decarboxylase polypeptide in which an amino acid at position 302 of an amino acid sequence of SEQ ID NO: 81 (i.e., arginine) is substituted with alanine, and a variant diaminopimelate dehydrogenase polypeptide in which an amino acid at position 169 of an amino acid sequence of SEQ ID NO: 82 (i.e., threonine) is substituted with leucine.

An amino acid sequence of the variant dihydrodipicolinate synthase polypeptide in which an amino acid at position 119 of the amino acid sequence of SEQ ID NO: 80 (i.e., tyrosine) is substituted with phenylalanine may be SEQ ID NO: 65, but is not limited thereto. The dihydrodipicolinate synthase (dapA) is an enzyme for biosynthesis of lysine from aspartyl semialdehyde which is a common precursor of lysine and threonine, and the function of the dihydrodipicolinate synthase is attenuated by substituting the amino acid at position 119 of the amino acid sequence (i.e., tyrosine) with phenylalanine, and as a result, the lysine-producing ability may be reduced. In exemplary embodiments of the present disclosure, it was confirmed that lysine production was reduced and threonine production was increased due to the introduction of the variant polypeptide.

An amino acid sequence of the variant diaminopimelate decarboxylase polypeptide in which an amino acid at position 302 of the amino acid sequence of SEQ ID NO: 81 (i.e., arginine) is substituted with alanine may be SEQ ID NO: 70, but is not limited thereto. The diaminopimelate decarboxylase (lysA) is the final enzyme that acts on lysine biosynthesis, and the function of the diaminopimelate decarboxylase is attenuated by substituting an amino acid at position 302 of the amino acid sequence (i.e., arginine) with alanine, and as a result, the lysine-producing ability may be reduced. In exemplary embodiments of the present disclosure, it was confirmed that lysine production was reduced and threonine production was increased due to the introduction of the variant polypeptide.

An amino acid sequence of the variant diaminopimelate dehydrogenase polypeptide in which an amino acid at position 169 of the amino acid sequence of SEQ ID NO: 82 (i.e., threonine) is substituted with leucine may be SEQ ID NO: 75, but is not limited thereto. The diaminopimelate dehydrogenase (ddh) is an enzyme that acts on lysine biosynthesis, and the function of the diaminopimelate dehydrogenase is attenuated by substituting the amino acid at position 169 of the amino acid sequence (i.e., threonine) with leucine, and as a result, the lysine-producing ability may be reduced. In exemplary embodiments of the present disclosure, it was confirmed that lysine production was reduced and threonine production was increased due to the introduction of the variant polypeptide.

Still another aspect of the present disclosure provides a method of producing threonine or threonine-derived L-amino acids, the method including the step of culturing the above-described microorganism in a medium.

Further, the present disclosure provides a method of producing threonine or threonine-derived L-amino acids, the method further including the step of recovering threonine or threonine-derived L-amino acids from the cultured microorganism or culture medium.

The microorganism may be a microorganism of the genus *Corynebacterium* including the variant dihydrodipicolinate reductase polypeptide of the present disclosure, as described above, and more specifically may be *Corynebacterium glutamicum*. Further, the microorganism of the genus *Corynebacterium* or *Corynebacterium glutamicum* may be a microorganism producing threonine or threonine-derived L-amino acids. The threonine-derived L-amino acids may include threonine-derived L-amino acids as well as derivatives thereof. The threonine-derived L-amino acids may include, for example, L-threonine, L-isoleucine, O-acetyl-L-homoserine, O-succinyl-L-homoserine, O-phospho-L-homoserine, L-methionine, and/or L-glycine, but are not limited thereto. More specifically, the threonine-derived L-amino acids may include L-threonine, L-isoleucine, O-acetyl-L-homoserine, O-succinyl-L-homoserine, and/or L-methionine, but are not limited thereto.

The threonine or threonine-derived L-amino acids may be a culture solution of threonine or threonine-derived L-amino acids, produced by the microorganism described in the present disclosure, or a purified form thereof. Further, it is apparent to one of ordinary skill in the art that the amino acid as it is and a salt thereof are also included.

The method of producing threonine or threonine-derived L-amino acids may be easily determined by one of ordinary skill in the art under optimized culture conditions and enzymatic activity conditions known in the art.

In the method, the step of culturing the microorganism may be performed by a known batch culture method, continuous culture method, fed-batch culture method, etc., but is not particularly limited thereto. In particular, with respect to the culture conditions, the culture condition may be, but is not particularly limited to, adjusted to a suitable pH (e.g., pH 5 to 9, specifically pH 6 to 8, and most specifically pH 6.8) using a basic compound (e.g., sodium hydroxide, potassium hydroxide, or ammonia) or an acidic compound (e.g., phosphoric acid or sulfuric acid). Additionally, oxygen or oxygen-containing gas mixture may be injected into the culture in order to maintain an aerobic state. The culture temperature may be maintained at 20° C. to 45° C., specifically at 25° C. to 40° C., but is not limited thereto. The culturing may be performed for about 10 hours to 160 hours, but is not limited thereto. The amino acid produced by the culturing (e.g., threonine or lysine) may be secreted in the medium or may remain in the cells.

Additionally, as a carbon source for the culture medium to be used, sugars and carbohydrates (e.g., glucose, sucrose, lactose, fructose, maltose, molasses, starch, and cellulose), oils and fats (e.g., soybean oil, sunflower seed oil, peanut oil, and coconut oil), fatty acids (e.g., palmitic acid, stearic acid, and linoleic acid), alcohols (e.g., glycerol and ethanol), organic acids (e.g., acetic acid), etc. may be used alone or in combination, but the carbon source is not limited thereto. As a nitrogen source, nitrogen-containing organic compounds (e.g., peptone, yeast extract, meat gravy, malt extract, corn steep liquor, soybean flour, and urea) or inorganic compounds (e.g., ammonium sulfate, ammonium chloride, ammonium phosphate, ammonium carbonate, and ammonium nitrate), etc. may be used alone or in combination, but the nitrogen source is not limited thereto. As a phosphorus source, potassium dihydrogen phosphate, dipotassium hydrogen phosphate, corresponding sodium-containing salts thereof, etc. may be used alone or in combination, but the phosphorus source is not limited thereto. In addition, essential growth-promoting materials such as other metal salts (e.g., magnesium sulfate or iron sulfate), amino acids, vitamins, etc. may be contained in the medium.

In the method of recovering threonine or threonine-derived L-amino acids produced in the culturing step of the present disclosure, the desired products may be collected from the culture solution using an appropriate method known in the art according to the culturing method. For example, centrifugation, filtration, anion-exchange chromatography, crystallization, HPLC, etc. may be used, and threonine or threonine-derived L-amino acid which is the desired product may be recovered from the culture or the microorganism using an appropriate method known in the art. Additionally, the step of recovering may further include a purification process, which can be performed using an appropriate method known in the art.

Still another aspect of the present disclosure provides a composition for producing L-threonine, the composition including a microorganism or a culture solution thereof including any one or more of the variant dihydrodipicolinate reductase polypeptide of the present disclosure; the polynucleotide encoding the variant; and the vector including the polynucleotide.

The dihydrodipicolinate reductase, the variant polypeptide thereof, the polynucleotide, the vector, and the microorganism are the same as described above.

The microorganism may be a microorganism of the genus Corynebacterium, specifically may be Corynebacterium glutamicum, but is not limited thereto. This is the same as described above.

The composition for producing L-threonine may refer to a composition capable of producing L-threonine by the variant dihydrodipicolinate reductase polypeptide of the present disclosure. The composition may include the variant dihydrodipicolinate reductase polypeptide or a constitution capable of operating the variant dihydrodipicolinate reductase polypeptide without limitation. The variant dihydrodipicolinate reductase polypeptide may be included in a vector such that the gene operably linked thereto may be expressed in host cells into which the vector is introduced.

The composition may further include a cryoprotectant or an excipient. The cryoprotectant or excipient may be a non-naturally occurring substance or a naturally occurring substance, but is not limited thereto. For another specific example, the cryoprotectant or excipient may be a substance that does not naturally contact with the microorganism, or a substance that is not naturally contained simultaneously with the microorganism, but is not limited thereto.

Still another aspect of the present disclosure provides use of the variant dihydrodipicolinate reductase polypeptide of the present disclosure; the polynucleotide encoding the variant; the vector including the polynucleotide; or the microorganism including any one or more thereof in producing L-threonine or threonine-derived L-amino acids.

MODE FOR CARRYING OUT THE INVENTION

Hereinafter, the present disclosure will be described in more detail with reference to Examples. However, these Examples are for illustrative purposes only, and the scope of the present disclosure is not limited to these Examples.

Example 1: Preparation of Library of Vector for Introducing Modification into dapB Gene ORF A library was prepared by the following method for the purpose of finding a variant in which an expression level of the dapB gene of Corynebacterium glutamicum or activity thereof was attenuated.

First, for the purpose of introducing 0-4.5 modifications per kb of a DNA fragment (747 bp) including the dapB (747 bp) gene, a GenemorphII Random Mutagenesis Kit (Stratagene) was used. Error-prone PCR was performed using the chromosomal DNA of Corynebacterium glutamicum ATCC13032 (WT) as a template along with a primer pair of SEQ ID NOs: 5 and 6. In detail, a reaction mixture including the chromosomal DNA (500 ng) of the WT strain, the primer pair of SEQ ID NOs: 5 and 6 (each 125 ng), Mutazyme II reaction buffer (1×), dNTP mix (40 mM), and Mutazyme II DNA polymerase (2.5 U) was subjected to denaturation at 94° C. for 2 minutes, followed by 25 cycles of denaturation at 94° C. for 1 minute, annealing at 56° C. for 1 minute, and polymerization at 72° C. for 2 minutes, and then polymerization at 72° C. for 10 minutes.

The amplified gene fragment was ligated into a pCRII vector using a TOPO TA Cloning Kit (Invitrogen), and transformed into E. coli DH5α, and spread on an LB solid medium containing kanamycin (25 mg/L). 20 kinds of transformed colonies were selected and plasmids were obtained, followed by sequencing. As a result, it was confirmed that modifications were introduced into different sites at a frequency of 0.5 mutations/kb. Finally, about 10,000 transformed E. coli colonies were obtained, and plasmids were extracted and designated as pTOPO-dapB(mt) library.

Example 2: Preparation of dapB-Deleted Strain and Screening for dapB Mutant Strain Based on Growth Rate To prepare a dapB gene-deleted strain from the wild-type Corynebacterium glutamicum ATCC13032, pDZ-ΔdapB which is a dapB gene-deleted vector was prepared as follows. In detail, DNA fragments (each 300 bp) located at the 5'- and 3'-ends of the dapB gene were ligated into a pDZ vector (Korean Patent No. 2009-0094433). Based on the reported nucleotide sequence (SEQ ID NO: 2) of the dapB gene, primers of SEQ ID NOS: 7 and 8, in which restriction enzyme SalI recognition sites were inserted at the 5'- and 3'-ends, and primers of SEQ ID NOS: 9 and 10 at 300 bp away therefrom were synthesized. A gene fragment at the 5'-end was prepared by PCR using the chromosomal DNA of Corynebacterium glutamicum ATCC13032 as a template along with a primer pair of SEQ ID NOS: 7 and 9. In the same manner, a gene fragment at the 3'-end of the gltA gene was prepared by PCR using a primer pair of SEQ ID NOS: 8 and 10. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes.

Meanwhile, the pDZ vector which was treated with a restriction enzyme SalI and heat-treated at 65° C. for 20 minutes, and the insertion DNA fragments amplified by the PCR were ligated with each other using an Infusion Cloning Kit, and transformed into E. coli DH5α, and spread on a LB solid medium containing kanamycin (25 mg/L). Colonies transformed with the vector into which the desired gene was inserted were selected by PCR using a primer pair of SEQ ID NOS: 7 and 8, and then plasmids were obtained by a commonly known plasmid extraction method, and designated as pDZ-ΔdapB.

The prepared vector pDZ-ΔdapB was transformed into Corynebacterium glutamicum ATCC13032 by an electric pulse method (Van der Rest et al., Appl. Microbial. Biotechnol. 52:541-545, 1999) to prepare a dapB gene-deleted strain by homologous recombination. Such a dapB gene-deleted strain was designated as *Corynebacterium glutamicum* 13032:ΔdapB.

Further, the 13032:ΔdapB strain was transformed with a pTOPO-dapB(mt) library by an electric pulse method, and spread on a complex medium plate containing kanamycin (25 mg/L) to obtain about 100 colonies. The obtained 100 kinds of strains were subjected to an L-lysine-producing ability test. Each of the obtained 100 kinds of strains was seeded in a 250 mL corner-baffle flask containing 25 mL of a seed medium, and cultured under shaking at 200 rpm at 30° C. for 20 hours. 1 mL of the seed culture was seeded in a 250 mL corner-baffle flask containing 24 mL of the following L-lysine production medium, and cultured under shaking at 200 rpm at 30° C. for 48 hours.

Lysine Production Medium (pH 7.0)

Glucose 100 g, $(NH_4)_2SO_4$ 40 g, Soybean Protein 2.5 g, Corn Steep Solids 5 g, Urea 3 g, $KH_2PO_4$ 1 g, $MgSO_4 \cdot 7H_2O$ 0.5 g, Biotin 100 μg, Thiamine HCl 1,000 μg, Calcium-Pantothenic Acid 2,000 μg, Nicotinamide 3,000 μg, $CaCO_3$ 30 g (based on 1 L of distilled water)

The 13032 and 13032:ΔdapB strains were used as control groups. After completing the culture, lysine production was measured by HPLC. 6 kinds of strains, which show a low L-lysine concentration as compared with the wild-type 13032 strain and which show a high L-lysine concentration as compared with the 13032:ΔdapB strain, were selected, and the amino acid concentrations in the culture of 6 kinds of the strains are shown in Table 1. The selected 6 kinds of strains were designated as 13032:dapB(mt)-1 to 6, respectively. Other 94 kinds of colonies showed a high L-lysine concentration as compared with the 13032 strain (i.e., the control group), or showed a similar L-lysine concentration as compared with the 13032:ΔdapB strain (i.e., the control group). Further, the growth rate of the 13032:ΔdapB strain was greatly reduced as compared with that of the 13032 strain, whereas the selected 6 kinds of strains maintained a higher growth rate compared to 13032:ΔdapB.

TABLE 1

Test of L-lysine production of selected 6 kinds of strains

|  | L-Lys (g/L) | Sugar consumption rate (g/hr) |
| --- | --- | --- |
| 13032 | 1.2 | 4.95 |
| 13032::dapB(mt)-1 | 0.2 | 4.23 |
| 13032::dapB(mt)-2 | 1.0 | 4.68 |
| 13032::dapB(mt)-3 | 0.5 | 3.47 |
| 13032::dapB(mt)-4 | 0.8 | 4.03 |
| 13032::dapB(mt)-5 | 0.9 | 3.62 |
| 13032::dapB(mt)-6 | 0.4 | 1.98 |
| 13032::dapB | 0.0 | 0.36 |

As shown in the results of Table 1, the selected 6 kinds of strains showed the lower L-lysine concentration than the WT strain and the higher L-lysine concentration than the 13032:ΔdapB strain.

Example 3: Sequencing of 6 Kinds of dapB Mutant Strains

To identify the sequences of the dapB genes of the selected 6 kinds of strains (i.e., 13032:dapB(mt)-1 to 6), the primers (SEQ ID NOS: 5 and 6) specified in Example 1 were used to amplify each DNA fragment containing the dapB gene in the chromosome by PCR. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes.

As a result of analyzing the sequences of the amplified genes, it was confirmed that, among the 6 kinds of strains, 13032:dapB(mt)-1 was a variant in which the existing CGT at positions 37 to 39 of SEQ ID NO: 2 were substituted with AAC and the amino acid at position 13 from the N-terminus thereof (i.e., arginine) was substituted with asparagine; 13032:dapB(mt)-2 was a variant in which the existing GTC at positions 106 to 108 of SEQ ID NO: 2 were substituted with ATC and the amino acid at position 36 from the N-terminus thereof (i.e., valine) was substituted with methionine; 13032:dapB(mt)-3 was a variant in which the existing GCT at positions 175 to 177 of SEQ ID NO: 2 were substituted with CTG and the amino acid at position 59 from the N-terminus thereof (i.e., alanine) was substituted with leucine; 13032:dapB(mt)-4 was a variant in which the existing ACG at positions 235 to 237 of SEQ ID NO: 2 were substituted with GCA and the amino acid at position 79 from the N-terminus thereof (i.e., threonine) was substituted with alanine, 13032:dapB(mt)-5 was a variant in which the existing ACG at positions 433 to 435 of SEQ ID NO: 2 were substituted with GCG and the amino acid at position 145 from the N-terminus thereof (i.e., threonine) was substituted with alanine; and 13032:dapB(mt)-6 was a variant in which G at position 414 of SEQ ID NO: 2 was substituted with C and the amino acid at position 138 from the N-terminus thereof (i.e., lysine) was substituted with arginine.

Among the 6 kinds of strains, 13032:dapB(mt)-1 strain showing the reduced L-lysine production, as compared with the WT strain 13032, and the low L-lysine production the most similarly to 13032:ΔdapB, and the similar growth rate to the WT strain 13032 was selected as the most excellent dihydrodipicolinate reductase activity-attenuated strain.

Example 4: Preparation of Various Strains in which Amino Acid at Position 13 of dapB Gene (i.e., Arginine) is Substituted with Different Amino Acids It was tried to substitute the amino acid at position 13 of SEQ ID NO: 1 with proteogenic amino acids other than arginine which is possessed by the wild-type.

To introduce 19 kinds of heterologous base substitution including R13N which was the modification confirmed in Example 3, respective recombinant vectors were constructed as follows.

First, the genomic DNA extracted from the WT strain was used as a template, and primers of SEQ ID NOS: 11 and 12, in which restriction enzyme SalI recognition sites were inserted at the 5'- and 3'-ends each at 600 bp upstream and downstream of positions 36 to 39 of the dapB gene, were synthesized. To introduce 19 kinds of heterologous base substitution, primers of SEQ ID NOS: 13 to 50 for substituting the nucleotide sequences at positions 36 to 39 of the dapB gene were synthesized.

In detail, the pDZ-dapB(R13N) plasmid was prepared, in which DNA fragments (each 600 bp) at the 5' and 3' ends of the dapB gene were linked to the pDZ vector (Korean Patent No. 2009-0094433). The 5'-end gene fragment was prepared by PCR using the chromosomal DNA of the WT strain as a template along with a primer pair of SEQ ID NOS: 11 and 13. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes. In the same manner, a gene fragment at the 3'-end of the dapB gene was prepared by PCR using primers of SEQ ID NOS: 12 and 14. The amplified DNA fragments were purified using a PCR Purification kit of Quiagen, and then used as insertion DNA fragments for vector construction.

Meanwhile, the pDZ vector which was treated with a restriction enzyme SalI and heat-treated at 65° C. for 20 minutes, and the insertion DNA fragments amplified by the PER were ligated with each other using an Infusion Cloning Kit, and transformed into *E. coli* DH5α. The strain was spread on a LB solid medium containing kanamycin (25 mg/L). Colonies transformed with the vector into which the desired gene was inserted were selected by PCR using primers of SEQ ID NOS: 11 and 12, and then plasmids were obtained by a commonly known plasmid extraction method, and designated as pDZ-dapB(R13N).

In the same manner, primers of SEQ ID NOS: 11 and 15, and 12 and 16 were used to prepare pDZ-dapB(R13G), primers of SEQ ID NOS: 11 and 17, and 12 and 18 were used to prepare pDZ-dapB(R13A), primers of SEQ ID NOS: 11 and 19, and 12 and 20 were used to prepare pDZ-dapB (R13V), primers of SEQ ID NOS: 11 and 21, and 12 and 22 were used to prepare pDZ-dapB(R13L), primers of SEQ ID NOS: 11 and 23, and 12 and 24 were used to prepare pDZ-dapB(R13I), primers of SEQ ID NOS: 11 and 25, and 12 and 26 were used to prepare pDZ-dapB(R13M), primers of SEQ ID NOS: 11 and 27, and 12 and 28 were used to prepare pDZ-dapB(R13F), primers of SEQ ID NOS: 11 and 29, and 12 and 30 were used to prepare pDZ-dapB(R13W), primers of SEQ ID NOS: 11 and 31, and 12 and 32 were used to prepare pDZ-dapB(R13P), primers of SEQ ID NOS: 11 and 33, and 12 and 34 were used to prepare pDZ-dapB (R13S), primers of SEQ ID NOS: 11 and 35, and 12 and 36 were used to prepare pDZ-dapB(R13T), primers of SEQ ID NOS: 11 and 37, and 12 and 38 were used to prepare pDZ-dapB(R13C), primers of SEQ ID NOS: 11 and 39, and 12 and 40 were used to prepare pDZ-dapB(R13Y), primers of SEQ ID NOS: 11 and 41, and 12 and 42 were used to prepare pDZ-dapB(R13Q), primers of SEQ ID NOS: 11 and 43, and 12 and 44 were used to prepare pDZ-dapB(R13D), primers of SEQ ID NOS: 11 and 45, and 12 and 46 were used to prepare pDZ-dapB(R13E), primers of SEQ ID NOS: 11 and 47, and 12 and 48 were used to prepare pDZ-dapB (R13K), primers of SEQ ID NOS: 11 and 49, and 12 and 50 were used to prepare pDZ-dapB(R13H).

In order to further clarify the lysine concentration and the growth rate according to introduction of dapB modification, each of the prepared vectors was transformed into a lysine-producing *Corynebacterium glutamicum* KCCM11016P strain (Korean Patent No. 10-0159812) by an electric pulse method. 19 kinds of strains in which heterologous base substitution was introduced into the dapB gene were designated as KCCM11016P:dapB (R13N), KCCM11016P:dapB (R13G), KCCM11016P:dapB (R13A), KCCM11016P:dapB (R13V), KCCM11016P:dapB (R13L), KCCM11016P:dapB (R13I), KCCM11016P:dapB (R13M), KCCM11016P:dapB (R13F), KCCM11016P:dapB (R13F), KCCM11016P:dapB (R13W), KCCM11016P:dapB (R13P), KCCM11016P:dapB (R13S), KCCM11016P:dapB (R13T), KCCM11016P:dapB (R13C), KCCM11016P:dapB (R13Y), KCCM11016P:dapB (R13Q), KCCM11016P:dapB (R13D), KCCM11016P:dapB (R13E), and KCCM11016P:dapB (R13K), respectively.

Example 5: Analysis of Lysine-Producing Ability of dapB Mutant Strains

The KCCM11016P strain was used as a control group, and the selected 19 kinds of strains were cultured by the following method to measure a sugar consumption rate, a lysine production yield, and a threonine production yield.

First, each strain was seeded in a 250 mL corner-baffle flask containing 25 mL of a seed medium, and then cultured under shaking at 200 rpm at 30° C. for 20 hours. Thereafter, 1 mL of the seed culture was seeded in a 250 mL corner-baffle flask containing 24 mL of a production medium, and cultured under shaking at 200 rpm at 32° C. for 72 hours. The compositions of the seed medium and the production medium are as follows. After completing the culture, L-lysine and L-threonine concentrations were measured by HPLC (Waters 2478).

<Seed Medium (pH 7.0)>

Glucose 20 g, Peptone 10 g, Yeast Extract 5 g, Urea 1.5 g, $KH_2PO_4$ 4 g, $K_2HPO_4$ 8 g, $MgSO_4 \cdot 7H_2O$ 0.5 g, Biotin 100 μg, Thiamine HCl 1,000 μg, Calcium-Pantothenic Acid 2,000 μg; Nicotinamide 2,000 μg (based on 1 L of distilled water)

<Production Medium (pH 7.0)>

Glucose 100 g, $(NH_4)_2SO_4$ 40 g, Soybean Protein 2.5 g, Corn Steep Solids 5 g, Urea 3 g, $KH_2PO_4$ 1 g, $MgSO_4 \cdot 7H_2O$. 0.5 g, Biotin 100 μg, Thiamine HCl 1,000 μg, Calcium-Pantothenic Acid 2,000 μg, Nicotinamide 3,000 μg, $CaCO_3$ 30 g (based on 1 L of distilled water)

The results of measuring the lysine- and threonine-producing ability and the sugar consumption rate are as in Table 2 below.

TABLE 2

Lysine and threonine-producing ability

| Strain | LYS concentration (g/L) | Thr concentration (g/L) | Sugar consumption rate (g/hr) |
|---|---|---|---|
| KCCM11016P | 43.4 | 1.2 | 4.53 |
| KCCM11016P::dapB(R13N) | 20.0 | 2.2 | 4.30 |
| KCCM11016P::dapB(R13G) | 10.5 | 0.8 | 2.10 |
| KCCM11016P::dapB(R13A) | 15.7 | 0.6 | 1.57 |
| KCCM11016P::dapB(R13V) | 11.1 | 1.0 | 1.23 |
| KCCM11016P::dapB(R13L) | 14.6 | 0.9 | 2.30 |
| KCCM11016P::dapB(R13I) | 20.0 | 1.2 | 1.23 |
| KCCM11016P::dapB(R13M) | 24.3 | 0.8 | 1.75 |
| KCCM11016P::dapB(R13F) | 18.3 | 1.1 | 2.93 |
| KCCM11016P::dapB(R13W) | 19.4 | 0.9 | 2.51 |
| KCCM11016P::dapB(R13P) | 27.6 | 1.0 | 2.60 |
| KCCM11016P::dapB(R13S) | 30.5 | 1.4 | 4.40 |
| KCCM11016P::dapB(R13T) | 31.4 | 1.5 | 4.51 |
| KCCM11016P::dapB(R13C) | 37.0 | 1.3 | 4.20 |
| KCCM11016P::dapB(R13Y) | 28.9 | 1.6 | 4.23 |
| KCCM11016P::dapB(R13Q) | 27.7 | 1.8 | 4.38 |
| KCCM11016P::dapB(R13D) | 21.5 | 1.0 | 2.75 |
| KCCM11016P::dapB(R13E) | 26.8 | 1.0 | 2.86 |
| KCCM11016P::dapB(R13K) | 40.1 | 1.2 | 4.40 |
| KCCM11016P::dapB(R13H) | 42.3 | 1.1 | 4.52 |
| 13032 | 1.2 | 0.0 | 4.53 |
| 13032::ΔdapB | 0.0 | 0.1 | 1.31 |
| 13032::dapB(R13N) | 0.2 | 0.2 | 4.06 |

With regard to the strain including the variant polypeptide in which the amino acid at position 13 of SEQ ID NO: 1 was substituted with another amino acid, it was confirmed that when the substituted amino acid was polar (S, T, C, Y, N, Q, K), the growth of the strain was maintained at an industrially applicable level, whereas lysine-producing ability was attenuated and threonine-producing ability was improved. Among them, the R13N mutant strain showed growth the most similar to that of the KCCM11016P strain, and showed the lowest lysine production and the highest threonine production.

Further, the R13S, R13T, R13C, R13Y, R13Q, and R13K mutant strains also maintained growth and showed the reduced lysine-producing ability while showing the improved threonine-producing ability.

In contrast, when substituted with amino acids having other different properties, threonine-producing ability was reduced, but the sugar consumption rate of the strains was equivalent to that of the control group, otherwise, was greatly reduced, indicating that they are not at an industrially applicable level.

These results confirmed that when the modification of the present disclosure was introduced, the growth of the strain was maintained at an appropriate level, and only the lysine yield was reduced, and threonine productivity was improved.

These results confirmed that, through controlling the dihydrodipicolinate reductase activity, the lysine-producing ability may be reduced at an appropriate level, and at the same time, carbon flux is directed into the threonine synthetic pathway to improve the threonine-producing ability while maintaining the growth rate of the strain caused by inhibition of cell wall synthesis due to the attenuated lysine biosynthetic pathway.

Example 6: Preparation of *Corynebacterium* Microorganism ATCC 13032-Based Strain in which Amino Acid at Position 13 of dapB Gene (i.e., Arginine) is Substituted with Asparagine In order to reconfirm the effect of the variant, in which the amino acid at position 13 was substituted with asparagine, in the wild-type strain, arginine which is an amino acid at position 13 in the amino acid sequence (SEQ ID NO: 1) of the intrinsic dihydrodipicolinate reductase possessed by *Corynebacterium glutamicum* ATCC 13032 was substituted with asparagine.

In detail, the pDZ-dapB(R13N) vector prepared in Example 4 was transformed into *Corynebacterium glutamicum* ATCC13032 by an electric pulse method. Such a strain, in which heterologous base substitution was introduced into the dapB gene, was designated as 13032:dapB(R13N).

Example 7: Analysis of Threonine- and Lysine-Producing Ability of dapB Mutant Strain Based on *Corynebacterium* Microorganism ATCC13032

The 13032:ΔdapB strain used in Example 1 and *Corynebacterium glutamicum* ATCC13032 strain were used as control groups, and the 13032:dapB(R13N) strain prepared in Example 6 was cultured by the following method to measure a sugar consumption rate and threonine and lysine production yields.

First, each strain was seeded in a 250 mL corner-baffle flask containing 25 mL of a seed medium, and cultured under shaking at 200 rpm at 30° C. for 20 hours. Thereafter, 1 mL of the seed culture was seeded in a 250 mL corner-baffle flask containing 24 mL of a production medium, and cultured under shaking at 200 rpm at 32° C. for 24 hours. The compositions of the seed medium and the production medium are as follows. After completing the culture, L-lysine and L-threonine concentrations were measured by HPLC (Waters 2478).

Seed Medium (pH 7.0)
Glucose 20 g, Peptone 10 g, Yeast Extract 5 g, Urea 1.5 g, $KH_2PO_4$ 4 g, $K_2HPO_4$ 8 g, $MgSO_4 \cdot 7H_2O$ 0.5 g, Biotin 100 µg, Thiamine HCl 1,000 µg, Calcium-Pantothenic Acid 2,000 µg, Nicotinamide 2,000 µg (based on 1 L of distilled water)

L-Threonine Production Medium (pH 7.2)
Glucose 30 g, $KH_2PO_4$ 2 g, Urea 3 g, $(NH_4)_2SO_4$ 40 g, Peptone 2.5 g, CSL (Sigma) 5 g (10 mL), $MgSO_4 \cdot 7H_2O$ 0.5 g, Leucine 400 mg, $CaCO_3$ 20 g (based on 1 L of distilled water)

The results of measuring the threonine- and lysine-producing ability and the sugar consumption rate are as in Table 3 below.

TABLE 3

Measurement of threonine and lysine concentrations and sugar consumption rate

| Strain | LYS concentration (g/L) | Thr concentration (g/L) | Sugar consumption rate (g/hr) |
|---|---|---|---|
| 13032 | 1.2 | 0.0 | 4.53 |
| 13032::ΔdapB | 0.0 | 0.1 | 1.31 |
| 13032::dapB(R13N) | 0.2 | 0.2 | 4.06 |

As compared with the parent strain, the dapB gene-deleted strain showed reduced lysine concentration and slightly increased threonine concentration, but did not consume sugar until the end of culture. In other words, when the strain has no lysine biosynthesis ability due to the deletion of the dapB gene, it can be seen that industrial application is difficult because growth of the strain is suppressed.

The 13032:dapB(R13N) strain including the variant polypeptide in which the amino acid at position 13 of SEQ ID NO: 1 (i.e., arginine) was substituted with asparagine was confirmed to show the reduced lysine concentration and the increased threonine concentration while maintaining the growth at an industrially applicable level. In other words, it was confirmed that introduction of the modification of the present disclosure shows the effects of improving the threonine concentration and reducing the concentration of the by-product lysine.

These results suggest that when the dihydrodipicolinate reductase activity is attenuated by introducing the modification into the dapB gene, direction of carbon flux from aspartyl semialdehyde which is a common precursor of threonine and lysine into the lysine biosynthesis is reduced, and thus carbon flux is directed into the threonine synthetic pathway, thereby improving the threonine production while reducing the by-product lysine production.

Example 8: Preparation of *Corynebacterium* Microorganism ATCC13869-Based Strain in which Amino Acid at Position 13 of dapB Gene (i.e., Arginine) is Substituted with Asparagine In order to reconfirm the effect of the variant, in which the amino acid at position 13 was substituted with asparagine, in the wild-type strain, arginine which is an amino acid at position 13 in the amino acid sequence (SEQ ID NO: 51) of the intrinsic dihydrodipicolinate reductase possessed by *Corynebacterium glutamicum* ATCC13869 was substituted with asparagine (SEQ ID NO: 53).

In detail, a recombinant vector for introducing the modification R13N confirmed in Example 5 into the *Corynebacterium glutamicum* ATCC 13869 strain was constructed as follows.

First, the pDZ-dapB(R13N)-13869 plasmid was prepared by using the same primers and method as in Example 4, except that genomic DNA extracted from the 13869 strain was used as a template.

The vector thus prepared was transformed into *Corynebacterium glutamicum* ATCC13869 by an electric pulse method. Such a strain, in which heterologous base substitution was introduced into the dapB gene, was designated as 13869:dapB(R13N).

Example 9: Preparation of dapB-Deleted Strain Based on *Corynebacterium* Microorganism ATCC 13869

The pDZ-ΔdapB prepared in Example 1 was transformed into *Corynebacterium glutamicum* ATCC13869 by an electric pulse method (Van der Rest et al., Appl. Microbial. Biotecnol. 52:541-545, 1999) to prepare a dapB gene-deleted strain by homologous recombination. Such a dapB gene-deleted strain was designated as *Corynebacterium glutamicum* 13869:ΔdapB.

Example 10: Analysis of Threonine and Lysine-Producing Ability of 13869-Based dapB Mutant Strain The *Corynebacterium glutamicum* ATCC13869 strain and the 13869:ΔdapB strain prepared in Example 9 were used as control groups, and the 13869:dapB(R13N) strain prepared in Example 8 was cultured by the same method as the above Examples to measure a sugar consumption rate and threonine and lysine production yields.

The results of measuring the threonine- and lysine-producing ability and the sugar consumption rate are as in Table 4 below.

TABLE 4

Measurement of threonine and lysine concentrations and sugar consumption rate

| Strain | LYS concentration (g/L) | Thr concentration (g/L) | Sugar consumption rate (g/hr) |
|---|---|---|---|
| 13869 | 0.9 | 0.0 | 4.53 |
| 13869::ΔdapB | 0.0 | 0.2 | 1.31 |
| 13869::dapB(R13N) | 0.3 | 0.3 | 4.17 |

As compared with the parent strain, the dapB gene-deleted strain showed reduced lysine concentration and slightly increased threonine concentration, but did not consume sugar until the end of culture. In other words, when the strain has no lysine biosynthesis ability due to the deletion of the dapB gene, it can be seen that industrial application is difficult because growth of the strain is suppressed. The 13869:dapB(R13N) strain, which includes the variant polypeptide in which the amino acid at position 13 (i.e., arginine) was substituted with asparagine as in SEQ ID NO: 53, was confirmed to show the reduced lysine concentration and the increased threonine concentration while maintaining the growth at an industrially applicable level.

In other words, it was confirmed that introduction of the modification of the present disclosure shows the effects of improving the threonine concentration and reducing the by-product lysine.

These results suggest that when the dihydrodipicolinate reductase activity is attenuated by introducing the modification into the dapB gene, direction of carbon flux from aspartyl semialdehyde which is a common precursor of threonine and lysine into the lysine biosynthesis is reduced, and thus carbon flux is directed into the threonine synthetic pathway, thereby improving the threonine production while reducing the by-product lysine production.

Example 11: Preparation of Threonine-Producing Strain-Based dapB(R13N) Modification-Introduced Strain To clarify changes in the L-threonine-producing ability by introduction of dapB(R13N) modification, a threonine-producing strain was prepared. In detail, to release feedback inhibition of aspartate kinase (lysC) which acts as a first key enzyme in the threonine biosynthetic pathway, a lysC (L377K) modification-introduced strain was prepared (Korean Patent No. 2009-0094433). A recombinant vector for the modification introduction was prepared as follows.

To prepare strains into which lysC(L377K) modification was introduced, the genomic DNA extracted from the 13,032 strain was used as a template, and primers of SEQ ID NOS: 56 and 57, in which restriction enzyme SmaI recognition sites were inserted at the 5'- and 3'-ends each at 500 bp upstream and downstream of positions 1128 to 1131 of the lysC gene, were synthesized. To introduce L377K heterologous base substitution, primers of SEQ ID NOS: 58 and 59 for substituting the nucleotide sequences at positions 1128 to 1131 of the lysC gene were synthesized.

In detail, the pDZ-lysC(L377K) plasmid was prepared, in which DNA fragments (each 515 bp, 538 bp) at the 5' and 3' ends of the lysC gene were linked to the pDZ vector (Korean Patent No. 2009-0094433). The 5'-end gene fragment was prepared by PCR using the chromosomal DNA of the 13,032 strain as a template and a primer pair of SEQ ID NOS: 5.6 and 58. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes. In the same manner, a gene fragment at the 3'-end of the lysC gene was prepared by PCR using SEQ ID NOS: 57 and 59. The amplified DNA fragments were purified using a PCR Purification kit of Quiagen, and then used as insertion DNA fragments for vector construction.

Meanwhile, the pDZ vector which was treated with a restriction enzyme SmaI and heat-treated at 65° C. for 20 minutes, and the insertion DNA fragments amplified by the PCR were ligated with each other using an Infusion Cloning Kit, and transformed into *E. coli*. DH5α. The strain was spread on a LB solid medium containing kanamycin (25 mg/L). Colonies transformed with the vector into which the desired gene was inserted were selected by PCR using primers of SEQ ID NOS: 56 and 57, and then plasmids were obtained by a commonly known plasmid extraction method, and designated as pDZ-lysC(L377K).

The prepared vector was transformed into the *Corynebacterium glutamicum* ATCC13032 strain by an electric pulse method. Such a strain, in which heterologous base substitution was introduced into the lysC gene, was designated as CJP1. CJP1 was designated as CA01-2307, and deposited under the Budapest Treaty in the international depository authority, Korean Culture Center of Microorganisms (KCCM), on Mar. 29, 2017, with the Accession No. KCCM12000P.

Next, into the prepared CJP1 strain, modification of the gene encoding homoserine dehydrogenase producing homoserine which is a common intermediate in the L-threonine and L-isoleucine biosynthetic pathways was introduced and enhanced. In detail, a strain was prepared, the strain having hom(R407H) modification in which the existing TTG at positions 1218 to 1221 was substituted with AAG as in SEQ ID NO: 60 and thus the amino acid at position 407 from the N-terminus thereof (i.e., arginine) was substituted with histidine. The recombinant vector for the modification introduction was prepared as follows.

First, the genomic DNA extracted from the 13,032 strain was used as a template, and primers of SEQ ID NOS: 61 and 62, in which restriction enzyme SalI recognition sites were inserted at the 5'- and 3'-ends each at 600 bp upstream and downstream of positions 1219 to 1221 of the hom gene, were synthesized. To introduce R407H heterologous base substitution, primers of SEQ ID NOS: 63 and 64 for substituting the nucleotide sequences at positions 1219 to 1221 of the hom gene were synthesized.

In detail, the pDZ-hom(R407H) plasmid was prepared, in which DNA fragments (each 600 bp) at the 5' and 3' ends of the hom gene were linked to the pDZ vector (Korean Patent No. 2009-0094433). The 5'-end gene fragment was prepared by PCR using the chromosomal DNA of the WT strain as a template and primers of SEQ ID NOS: 61 and 63. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes. In the same manner, a gene fragment at the 3'-end of the hom gene was prepared by PCR using primers of SEQ ID NOS: 62 and 64. The amplified DNA fragments were purified using a PCR Purification kit of Quiagen, and then used as insertion DNA fragments for vector construction.

Meanwhile, the pDZ vector which was treated with a restriction enzyme SalI and heat-treated at 65° C. for 20 minutes, and the insertion DNA fragments amplified by the PCR were ligated with each other using an Infusion Cloning Kit, and transformed into E. coli DH5α. The strain was spread on a LB solid medium containing kanamycin (25 mg/L). Colonies transformed with the vector into which the desired gene was inserted were selected by PCR using primers of SEQ ID NOS: 61 and 62, and then plasmids were obtained by a commonly known plasmid extraction method, and designated as pDZ-hom(R407H).

The prepared vector was transformed into CJP1 by an electric pulse method. Such a strain, in which heterologous base substitution was introduced into the hom gene, was designated as CA09-0900 (Accession No. KCCM12418P).

To examine changes in the L-threonine production and lysine production by introduction of the variant dihydrodipicolinate reductase into the strain, the modification confirmed in Example 4 was introduced into the gene encoding dihydrodipicolinate reductase. In detail, to introduce R13N modification into the CA09-0900 strain, the pDZ-R13N vector prepared in Example 4 was transformed into the CA09-0900 strain by electroporation, and in the same manner as in Example 4, a strain having the modification on the chromosome was obtained through a secondary crossover process. This strain having substitution of the variant nucleotide was designated as CA09-0903.

The CA09-0903 strain was deposited under the Budapest Treaty in the international depository authority, Korean Culture Center of Microorganisms (KCCM), on Apr. 25, 2019, with the Accession No. KCCM12502P.

Example 12: Analysis of Threonine- and Lysine-Producing Ability of Threonine-Producing Strain-Based dapB Mutant Strain The CA09-0900 strain prepared in Example 10 was used as a control group, and the CA09-0903 strain was cultured by the same method as in Example 7 to measure threonine and lysine production yields.

The results of measuring the threonine- and lysine-producing ability are as in Table 5 below:

TABLE 5

| Measurement of threonine and lysine concentrations | | |
|---|---|---|
| Strain | LYS concentration (g/L) | Thr concentration (g/L) |
| CA09-0900 | 3.10 | 2.47 |
| CA09-0903 | 1.50 | 3.40 |

As a result, the strain into which the modification was introduced showed the reduced L-lysine production and the increased L-threonine production of 1.07 g/L, as compared with the control CA09-0900 strain, indicating that the modification of substituting the amino acid at position 13 of dihydrodipicolinate reductase (dapB) is introduced to obtain the effects of reducing the lysine production and increasing the threonine production.

Example 13: Preparation of Strain Having Additional Attenuation of Lysine Pathway (dapA)

To clarify changes in the L-threonine-producing ability by additional attenuation of the lysine biosynthetic pathway, experiments were performed by additionally attenuating genes in the lysine biosynthetic pathway. First, a strain was prepared for introducing a modification known in a literature to attenuate the activity of dihydrodipicolinate synthase (dapA) which is the first enzyme acting on the biosynthesis of lysine from aspartyl semialdehyde which is a common precursor of lysine and threonine (J Mol Biol. 2004 Apr. 23; 338(2):329-39). In detail, prepared was a strain having dapA(Y119F) modification (SEQ ID NO: 80) in which the existing TAC was modified to TTT at positions 355 to 357 of the nucleotide sequence of dihydrodipicolinate synthase (dapA) as in SEQ ID NO: 65, and as a result, the amino acid at position 119 from the N-terminus (i.e., tyrosine) was substituted with phenylalanine. The recombinant vector for the modification introduction was prepared as follows.

To prepare strains into which dapA(Y119F) modification was introduced, the genomic DNA extracted from the 13032 strain was used as a template, and primers of SEQ ID NOS: 66 and 67, in which restriction enzyme SalI recognition sites were inserted at the 5'- and 3'-ends at 350 bp and 610 bp upstream and downstream of positions 355 to 357 of the dapA gene, were synthesized. To introduce Y119F heterologous base substitution, primers of SEQ ID NOS: 68 and 69 for substituting the nucleotide sequences at positions 355 to 357 of the dapA gene were synthesized.

In detail, the pDZ-dapA(Y119F) plasmid was prepared, in which DNA fragments (each 350 bp, 610 bp) at the 5' and 3' ends of the dapA gene were linked to the pDZ vector (Korean Patent No. 2009-0094433). The 5'-end gene fragment was prepared by PCR using the chromosomal DNA of the 13032 strain as a template and a primer pair of SEQ ID NOS: 66 and 68. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes. In the same manner, a gene fragment at the 3'-end of the dapA gene was prepared by PCR using primers of SEQ ID NOS: 67 and 69. The amplified DNA fragments were purified using a PCR Purification kit of Quiagen, and then used as insertion DNA fragments for vector construction.

Meanwhile, the pDZ vector which was treated with a restriction enzyme SalI and heat-treated at 65° C. for 20 minutes, and the insertion DNA fragments amplified by the PCR were ligated with each other using an Infusion Cloning Kit, and transformed into E. coli DH5α. The strain was spread on a LB solid medium containing kanamycin (25 mg/L). Colonies transformed with the vector into which the desired gene was inserted were selected by PCR using primers of SEQ ID NOS: 66 and 67, and then plasmids were obtained by a commonly known plasmid extraction method, and designated as pDZ-dapA (Y119F).

The prepared vector was transformed into the CA09-0903 strain prepared in Example 11 by an electric pulse method. Such a strain, in which heterologous base substitution was introduced into the dapA gene, was designated as CA09-0903/dapA(Y1.19F).

Example 14: Analysis of Threonine and Lysine-Producing Ability of dapA Mutant Strain The CA09-0903 strain prepared in Example 11 was used as a control group, and the CA09-0903/dapA(Y119F) strain was cultured by the same method as in Example 7 to measure threonine and lysine production yields.

The results of measuring the threonine- and lysine-producing ability are as in Table 6 below.

TABLE 6

Measurement of threonine and lysine concentrations

| Strain | LYS concentration (g/L) | Thr concentration (g/L) |
|---|---|---|
| CA09-0903 | 1.50 | 3.40 |
| CA09-0903/dapA(Y119F) | 1.10 | 4.30 |

As a result, the strain into which the dapA(Y119F) modification was additionally introduced showed the reduced L-lysine production and the increased L-threonine production of 0.90 g/L, as compared with the control CA09-0903 strain, indicating that the additional introduction of the amino acid variant at position 119 of dihydrodipicolinate synthase dapA is performed to obtain the effects of further reducing the lysine production and further increasing the threonine production due to additional attenuation of the lysine biosynthetic pathway.

Example 15: Preparation of Strain Having Additional Attenuation of Lysine Pathway (lysA)

To clarify changes in the L-threonine-producing ability by additional attenuation of the lysine biosynthetic pathway, additional attenuation of genes in the lysine biosynthetic pathway was performed. A strain was prepared for introducing a modification known in a literature to attenuate the activity of diaminopimelate decarboxylase (lysA) which is the last enzyme acting on the lysine biosynthesis (Biochem Biophys Res Commun. 2018 Jan. 8; 495(2):1815-1821). In detail, prepared was a strain having lysA(R302A) modification in which the existing CGC was modified to GCA at positions 904 to 906 of the nucleotide sequence of diaminopimelate decarboxylase (lysA) as in SEQ ID NO: 70, and as a result, the amino acid at position 302 from the N-terminus (i.e., arginine) was substituted with alanine (SEQ ID NO: 81). The recombinant vector for the modification introduction was prepared as follows.

To prepare strains into which lysA(R302A) modification was introduced, the genomic DNA extracted from the 13032 strain was used as a template, and primers of SEQ ID NOS: 71 and 72, in which restriction enzyme SalI recognition sites were inserted at the 5'- and 3'-ends each at 500 bp upstream and downstream of positions 904 to 906 of the lysA gene, were synthesized. To introduce R302A heterologous base substitution, primers of SEQ ID NOS: 73 and 74 for substituting the nucleotide sequences at positions 904 to 906 of the lysA gene were synthesized.

In detail, the pDZ-lysA(R302A) plasmid was prepared, in which DNA fragments (each 500 bp) at the 5' and 3' ends of the lysA gene were linked to the pDZ vector (Korean Patent No. 2009-0094433). The 5'-end gene fragment was prepared by PCR using the chromosomal DNA of the 13032 strain as a template and primers of SEQ ID NOS: 71 and 73. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds; and then polymerization at 72° C. for 10 minutes. In the same manner, a gene fragment at the 3'-end of the lysA gene was prepared by PCR using SEQ ID NOS: 72 and 74. The amplified DNA fragments were purified using a PCR Purification kit of Quiagen, and then used as insertion DNA fragments for vector construction.

Meanwhile, the pDZ vector which was treated with a restriction enzyme SalI and heat-treated at 65° C. for 20 minutes, and the insertion DNA fragment amplified by PCR were ligated with each other using an Infusion Cloning Kit, and transformed into E. coli DH5α. The strain was spread on a LB solid medium containing kanamycin (25 mg/L). Colonies transformed with the vector into which the desired gene was inserted were selected by PCR using primers of SEQ ID NOS: 66 and 67, and then plasmids were obtained by a commonly known plasmid extraction method, and designated as pDZ-lysA(R302A).

The prepared vector was transformed into the CA09-0903 strain prepared in Example 11 by an electric pulse method. Such a strain, in which heterologous base substitution was introduced into the lysA gene, was designated as CA09-0903/lysA(R302A).

Example 16: Analysis of Threonine- and Lysine-Producing Ability of lysA Mutant Strain The CA09-0903 strain prepared in Example 11 was used as a control group, and the CA09-0903/lysA(R302A) strain was cultured by the same method as in Example 7 to measure threonine and lysine production yields.

The results of measuring the threonine- and lysine-producing ability are as in Table 7 below.

TABLE 7

Measurement of threonine and lysine concentrations

| Strain | LYS concentration (g/L) | Thr concentration (g/L) |
|---|---|---|
| CA09-0903 | 1.50 | 3.40 |
| CA09-0903/lysA(R302A) | 1.30 | 3.60 |

As a result, the strain into which the lysA(R302A) modification was additionally introduced showed the reduced L-lysine production and the increased L-threonine production of 0.20 g/L, as compared with the control CA09-0903 strain, indicating that the introduction of the amino acid variant at position 302 of the lysA gene is performed to obtain the effects of further reducing the lysine production and further increasing the threonine production due to additional attenuation of the lysine biosynthetic pathway.

Example 17: Preparation of Strain Having Additional Attenuation of Lysine Pathway (ddh)

To clarify changes in the L-threonine-producing ability by additional attenuation of the lysine biosynthetic pathway, additional attenuation of genes in the lysine biosynthetic pathway was performed. A strain was prepared for attenuating the activity of diaminopimelate dehydrogenase (ddh) which is an enzyme acting on the lysine biosynthesis. In detail, prepared was a strain having ddh(T169L) modification in which the existing ACC was modified to CTC at positions 505 to 507 of the nucleotide sequence of diaminopimelate dehydrogenase (ddh) as in SEQ ID NO: 75, and as a result, the amino acid at position 169 from the N-terminus (i.e., threonine) was substituted with leucine (SEQ ID NO: 82). The recombinant vector for the modification introduction was prepared as follows.

To prepare strains into which ddh(T169L) modification was introduced, the genomic DNA extracted from the 13032 strain was used as a template, and primers of SEQ ID NOS: 76 and 77, in which restriction enzyme SalI recognition sites were inserted at the 5'- and 3'-ends each at 500 bp upstream and downstream of positions 505 to 507 of the lysA gene, were synthesized. To introduce T169L heterologous base substitution, primers of SEQ ID NOS: 78 and 79 for substituting the nucleotide sequences at positions 505 to 507 of the ddh gene were synthesized.

In detail, the pDZ-ddh(T169L) plasmid was prepared, in which DNA fragments (each 500 bp) at the 5' and 3' ends of the ddh gene were linked to the pDZ vector (Korean Patent No. 2009-0094433). The 5'-end gene fragment was prepared by PCR using the chromosomal DNA of the 13032 strain as a template and primers of SEQ ID NOS: 76 and 78. PCR conditions were as follows: denaturation at 94° C. for 2 minutes, followed by 30 cycles of denaturation at 94° C. for 1 minute, annealing at 56° C. for 1 minute, and polymerization at 72° C. for 40 seconds, and then polymerization at 72° C. for 10 minutes. In the same manner, a gene fragment at the 3'-end of the ddh gene was prepared by PCR using primers of SEQ ID NOS: 77 and 79. The amplified DNA fragments were purified using a PCR Purification kit of Quiagen, and then used as insertion DNA fragments for vector construction.

Meanwhile, the pDZ vector which was treated with a restriction enzyme SalI and heat-treated at 65° C. for 20 minutes, and the insertion DNA fragments amplified by the PCR were ligated with each other using an Infusion Cloning Kit, and transformed into E. coli DH5α. The strain was spread on a LB solid medium containing kanamycin (25 mg/L). Colonies transformed with the vector into which the desired gene was inserted were selected by PCR using primers of SEQ ID NOS: 76 and 77, and then plasmids were obtained by a commonly known plasmid extraction method, and designated as pDZ-ddh(T169L).

The prepared vector, was transformed into the CA09-0903 strain prepared in Example 11 by an electric pulse method. Such a strain, in which heterologous base substitution was introduced into the ddh gene, was designated as CA09-0903/ddh(T169L).

Example 16: Analysis of Threonine- and Lysine-Producing Ability of Ddh Mutant Strain The CA09-0903 strain prepared in Example 11 was used as a control group, and the CA09-0903/ddh(T169L) strain was cultured by the same method as in Example 7 to measure threonine and lysine production yields.

The results of measuring the threonine- and lysine-producing ability are as in Table 8 below.

TABLE 8

Measurement of threonine and lysine concentrations

| Strain | LYS concentration (g/L) | Thr concentration (g/L) |
|---|---|---|
| CA09-0903 | 1.50 | 3.40 |
| CA09-0903/ddh(T169L) | 1.25 | 3.75 |

As a result, the strain into which the ddh(T169L) modification was additionally introduced showed the reduced L-lysine production and the increased L-threonine production of 0.35 g/L, as compared with the control CA09-0903 strain, indicating that the introduction of the amino acid variant at position 169 of the ddh gene is performed to obtain the effects of further reducing the lysine production and further increasing the threonine production due to additional attenuation of the lysine biosynthetic pathway.

Based on the above description, it will be understood by one of ordinary skill in the art that the present disclosure may be implemented in a different specific form without changing the technical spirit or essential characteristics thereof. Therefore, it should be understood that the above embodiment is not limitative, but illustrative in all aspects. The scope of the disclosure is defined by the appended claims rather than by the description preceding them, and therefore all changes and modifications that fall within metes and bounds of the claims, or equivalents of such metes and bounds are therefore intended to be embraced by the claims.

[Accession Number]
International Depositary Authority: Korean Culture Center of Microorganisms
Accession No: KCCM12502P
Date of deposit: 20190425

The invention claimed is:

1. A variant polypeptide having dihydrodipicolinate reductase activity, comprising an amino acid sequence having at least 90% sequence identity to the amino acid sequence of SEQ ID NO: 1 with the exception of a substitution at position 13 with respect to the amino acid positions of SEQ ID NO: 1, wherein said substitution at position 13 is an asparagine, threonine, cysteine, tyrosine, serine, lysine, or glutamine, and wherein the dihydropicolinate reductase activity of the variant polypeptide is attenuated, as compared to said activity of the polypeptide having the amino acid sequence of SEQ ID NO: 1 or activity of the same variant polypeptide without the substitution at position 13.

2. The variant polypeptide of claim 1, wherein the amino acid sequence having at least 90% sequence identity to said amino acid sequence of SEQ ID NO: 1 is SEQ ID NO: 51.

3. The variant polypeptide of claim 1, wherein the variant polypeptide consists of the amino acid sequence of SEQ ID NO: 3 or SEQ ID NO: 53.

4. A polynucleotide encoding the variant polypeptide of claim 1.

5. The polynucleotide of claim 4, wherein the polynucleotide consists of the nucleotide sequence of SEQ ID NO: 4 or SEQ ID NO: 54.

6. A microorganism of the genus *Corynebacterium* comprising the variant polypeptide according to claim 1.

7. The microorganism of the genus *Corynebacterium* of claim 6, wherein the amino acid sequence having at least 90% identity to the amino acid sequence of SEQ ID NO: 1 is SEQ ID NO: 51.

8. The microorganism of the genus *Corynebacterium* of claim 6, further comprising one or more of the variant polypeptides selected from the following variant polypeptides of (1) to (3): (1) a variant polypeptide having attenuated dihydrodipicolinate synthase activity; (2) a variant polypeptide having attenuated diaminopimelate decarboxylase activity; and (3) a variant polypeptide having attenuated diaminopimelate dehydrogenase activity.

9. The microorganism of the genus *Corynebacterium* of claim 8, wherein the variant polypeptide includes one or more of the variant polypeptides selected from the following variant polypeptides of (1) to (3): (1) a variant dihydrodipicolinate synthase polypeptide wherein tyrosine at position 119 of the amino acid sequence of SEQ ID NO: 65 is substituted with phenylalanine; (2) a variant diaminopimelate decarboxylase polypeptide wherein arginine at position 302 of the amino acid sequence of SEQ ID NO: 70 is substituted with alanine; and (3) a variant diaminopimelate dehydrogenase polypeptide wherein threonine at position 169 of the amino acid sequence of SEQ ID NO: 75 is substituted with leucine.

10. The microorganism of the genus *Corynebacterium* of claim 6, wherein the microorganism has increased L-threonine-producing ability, as compared with a non-modified strain.

11. The microorganism of the genus *Corynebacterium* of claim 6, wherein the microorganism is *Corynebacterium glutamicum*.

12. A method of producing L-threonine, the method comprising the step of culturing, in a medium, a microorganism of the genus *Corynebacterium* comprising the variant polypeptide according to claim 1.

13. The method of claim 12, wherein the polypeptide sequence having at least 90% identity to SEQ ID NO: 1 is SEQ ID NO: 51.

14. The method of claim 12, further comprising the step of recovering L-threonine from the medium and microorganism cultured in the step of culturing the microorganism.

15. A microorganism of the genus *Corynebacterium* comprising the polynucleotide according to claim 4 or a vector comprising the polynucleotide.

16. A method of producing L-threonine, the method comprising the step of culturing, in a medium, a microorganism of the genus *Corynebacterium* comprising the polynucleotide according to claim 4 or a vector comprising the polynucleotide.

* * * * *

SEQUENCE LISTING

<160> NUMBER OF SEQ ID NOS: 82

<210> SEQ ID NO 1
<211> LENGTH: 248
<212> TYPE: PRT

<213> ORGANISM: Artificial Sequence
<220> FEATURE:
<223> OTHER INFORMATION: Synthetic: dapB aa seq.

<400> SEQUENCE: 1

```
Met Gly Ile Lys Val Gly Val Leu Gly Ala Lys Gly Arg Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Leu Ser Leu Leu Val Asp Asn Gly Ala
        35                  40                  45

Glu Val Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

Phe Asp Asp Ala Arg Leu Glu Gln Val Arg Asp Trp Leu Glu Gly Lys
                85                  90                  95

Asp Asn Val Gly Val Leu Ile Ala Pro Asn Phe Ala Ile Ser Ala Val
            100                 105                 110

Leu Thr Met Val Phe Ser Lys Gln Ala Ala Arg Phe Phe Glu Ser Ala
        115                 120                 125

Glu Val Ile Glu Leu His His Pro Asn Lys Leu Asp Ala Pro Ser Gly
    130                 135                 140

Thr Ala Ile His Thr Ala Gln Gly Ile Ala Ala Ala Arg Lys Glu Ala
145                 150                 155                 160

Gly Met Asp Ala Gln Pro Asp Ala Thr Glu Gln Ala Leu Glu Gly Ser
                165                 170                 175

Arg Gly Ala Ser Val Asp Gly Ile Pro Val His Ala Val Arg Met Ser
            180                 185                 190

Gly Met Val Ala His Glu Gln Val Ile Phe Gly Thr Gln Gly Gln Thr
        195                 200                 205

Leu Thr Ile Lys Gln Asp Ser Tyr Asp Arg Asn Ser Phe Ala Pro Gly
    210                 215                 220

Val Leu Val Gly Val Arg Asn Ile Ala Gln His Pro Gly Leu Val Val
225                 230                 235                 240

Gly Leu Glu His Tyr Leu Gly Leu
                245
```

<210> SEQ ID NO 2
<211> LENGTH: 747
<212> TYPE: DNA
<213> ORGANISM: Artificial Sequence
<220> FEATURE:
<223> OTHER INFORMATION: Synthetic: dapB nt seq.

<400> SEQUENCE: 2

```
atgggaatca aggttggcgt tctcggagcc aaaggccgtg ttggtcaaac tattgtggca    60
gcagtcaatg agtccgacga tctggagctt gttgcagaga tcggcgtcga cgatgatttg   120
agccttctgg tagacaacgg cgctgaagtt gtcgttgact tcaccactcc taacgctgtg   180
atgggcaacc tggagttctg catcaacaac ggcatttctg cggttgttgg aaccacgggc   240
ttcgatgatg ctcgtttgga gcaggttcgc gactggcttg aaggaaaaga caatgtcggt   300
gttctgatcg cacctaactt tgctatctct gcggtgttga ccatggtctt ttccaagcag   360
gctgcccgct tcttcgaatc agctgaagtt attgagctgc accaccccaa caagctggat   420
gcaccttcag gcaccgcgat ccacactgct cagggcattg ctgcggcacg caaagaagca   480
```

```
ggcatggacg cacagccaga tgcgaccgag caggcacttg agggttcccg tggcgcaagc       540
gtagatggaa tcccggttca tgcagtccgc atgtccggca tggttgctca cgagcaagtt       600
atctttggca cccagggtca gaccttgacc atcaagcagg actcctatga tcgcaactca       660
tttgcaccag gtgtcttggt gggtgtgcgc aacattgcac agcacccagg cctagtcgta       720
ggacttgagc attacctagg cctgtaa                                           747
```

```
<210> SEQ ID NO 3
<211> LENGTH: 248
<212> TYPE: PRT
<213> ORGANISM: Artificial Sequence
<220> FEATURE:
<223> OTHER INFORMATION: Synthetic: dapB variant aa seq.

<400> SEQUENCE: 3
```

```
Met Gly Ile Lys Val Gly Val Leu Gly Ala Lys Gly Asn Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Leu Ser Leu Leu Val Asp Asn Gly Ala
        35                  40                  45

Glu Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

Phe Asp Asp Ala Arg Leu Glu Gln Val Arg Asp Trp Leu Glu Gly Lys
                85                  90                  95

Asp Asn Val Gly Val Leu Ile Ala Pro Asn Phe Ala Ile Ser Ala Val
            100                 105                 110

Leu Thr Met Val Phe Ser Lys Gln Ala Ala Arg Phe Phe Glu Ser Ala
        115                 120                 125

Glu Val Ile Glu Leu His His Pro Asn Lys Leu Asp Ala Pro Ser Gly
    130                 135                 140

Thr Ala Ile His Thr Ala Gln Gly Ile Ala Ala Arg Lys Glu Ala
145                 150                 155                 160

Gly Met Asp Ala Gln Pro Asp Ala Thr Glu Gln Ala Leu Glu Gly Ser
                165                 170                 175

Arg Gly Ala Ser Val Asp Gly Ile Pro Val His Ala Val Arg Met Ser
            180                 185                 190

Gly Met Val Ala His Glu Gln Val Ile Phe Gly Thr Gln Gly Gln Thr
        195                 200                 205

Leu Thr Ile Lys Gln Asp Ser Tyr Asp Arg Asn Ser Phe Ala Pro Gly
    210                 215                 220

Val Leu Val Gly Val Arg Asn Ile Ala Gln His Pro Gly Leu Val Val
225                 230                 235                 240

Gly Leu Glu His Tyr Leu Gly Leu
                245
```

```
<210> SEQ ID NO 4
<211> LENGTH: 747
<212> TYPE: DNA
<213> ORGANISM: Artificial Sequence
<220> FEATURE:
<223> OTHER INFORMATION: Synthetic: dapB variant nt seq.

<400> SEQUENCE: 4
```

-continued

| | |
|---|---|
| atgggaatca aggttggcgt tctcggagcc aaaggcaacg ttggtcaaac tattgtggca | 60 |
| gcagtcaatg agtccgacga tctggagctt gttgcagaga tcggcgtcga cgatgatttg | 120 |
| agccttctgg tagacaacgg cgctgaagtt gtcgttgact tcaccactcc taacgctgtg | 180 |
| atgggcaacc tggagttctg catcaacaac ggcatttctg cggttgttgg aaccacgggc | 240 |
| ttcgatgatg ctcgtttgga gcaggttcgc gactggcttg aaggaaaaga caatgtcggt | 300 |
| gttctgatcg cacctaactt tgctatctct gcggtgttga ccatggtctt ttccaagcag | 360 |
| gctgcccgct tcttcgaatc agctgaagtt attgagctgc accacccaa caagctggat | 420 |
| gcaccttcag gcaccgcgat ccacactgct cagggcattg ctgcggcacg caaagaagca | 480 |
| ggcatggacg cacagccaga tgcgaccgag caggcacttg agggttcccg tggcgcaagc | 540 |
| gtagatggaa tcccggttca tgcagtccga atgtccggca tggttgctca cgagcaagtt | 600 |
| atctttggca cccagggtca gaccttgacc atcaagcagg actcctatga tcgcaactca | 660 |
| tttgcaccag tgtcttggt gggtgtgcgc aacattgcac agcacccagg cctagtcgta | 720 |
| ggacttgagc attacctagg cctgtaa | 747 |

<210> SEQ ID NO 5
<211> LENGTH: 21
<212> TYPE: DNA
<213> ORGANISM: Artificial Sequence
<220> FEATURE:
<223> OTHER INFORMATION: Synthetic: primer

<400> SEQUENCE: 5

| | |
|---|---|
| atgggaatca aggttggcgt t | 21 |

<210> SEQ ID NO 6
<211> LENGTH: 21
<212> TYPE: DNA
<213> ORGANISM: Artificial Sequence
<220> FEATURE:
<223> OTHER INFORMATION: Synthetic: primer

<400> SEQUENCE: 6

| | |
|---|---|
| ttacaggcct aggtaatgct c | 21 |

<210> SEQ ID NO 7
<211> LENGTH: 35
<212> TYPE: DNA
<213> ORGANISM: Artificial Sequence
<220> FEATURE:
<223> OTHER INFORMATION: Synthetic: primer

<400> SEQUENCE: 7

| | |
|---|---|
| atcctctaga gtcgacatcc ctagaacgga acaaa | 35 |

<210> SEQ ID NO 8
<211> LENGTH: 34
<212> TYPE: DNA
<213> ORGANISM: Artificial Sequence
<220> FEATURE:
<223> OTHER INFORMATION: Synthetic: primer

<400> SEQUENCE: 8

| | |
|---|---|
| atgcctgcag gtcgacttcc gcgccctcaa catc | 34 |

<210> SEQ ID NO 9
<211> LENGTH: 33
<212> TYPE: DNA
<213> ORGANISM: Artificial Sequence

```
<220> FEATURE:
<223> OTHER INFORMATION: Synthetic: primer

<400> SEQUENCE: 9
ggtgccaaag ataacaactt cagcgccgtt gtc                              33

<210> SEQ ID NO 10
<211> LENGTH: 33
<212> TYPE: DNA
<213> ORGANISM: Artificial Sequence
<220> FEATURE:
<223> OTHER INFORMATION: Synthetic: primer

<400> SEQUENCE: 10
aacggcgctg aagttgttat ctttggcacc cag                              33

<210> SEQ ID NO 11
<211> LENGTH: 34
<212> TYPE: DNA
<213> ORGANISM: Artificial Sequence
<220> FEATURE:
<223> OTHER INFORMATION: Synthetic: primer

<400> SEQUENCE: 11
atcctctaga gtcgacgata tcaaaaacaa ctcg                             34

<210> SEQ ID NO 12
<211> LENGTH: 35
<212> TYPE: DNA
<213> ORGANISM: Artificial Sequence
<220> FEATURE:
<223> OTHER INFORMATION: Synthetic: primer

<400> SEQUENCE: 12
atgcctgcag gtcgacctgc ttgatggtca aggtc                            35

<210> SEQ ID NO 13
<211> LENGTH: 36
<212> TYPE: DNA
<213> ORGANISM: Artificial Sequence
<220> FEATURE:
<223> OTHER INFORMATION: Synthetic: primer

<400> SEQUENCE: 13
aatagtttga ccaacgttgc ctttggctcc gagaac                           36

<210> SEQ ID NO 14
<211> LENGTH: 36
<212> TYPE: DNA
<213> ORGANISM: Artificial Sequence
<220> FEATURE:
<223> OTHER INFORMATION: Synthetic: primer

<400> SEQUENCE: 14
ctcggagcca aaggcaacgt tggtcaaact attgtg                           36

<210> SEQ ID NO 15
<211> LENGTH: 36
<212> TYPE: DNA
<213> ORGANISM: Artificial Sequence
<220> FEATURE:
<223> OTHER INFORMATION: Synthetic: primer

<400> SEQUENCE: 15
aatagtttga ccaacaccgc ctttggctcc gagaac                           36
```

<210> SEQ ID NO 16
<211> LENGTH: 36
<212> TYPE: DNA
<213> ORGANISM: Artificial Sequence
<220> FEATURE:
<223> OTHER INFORMATION: Synthetic: primer

<400> SEQUENCE: 16
ctcggagcca aggcggtgt tggtcaaact attgtg                          36

<210> SEQ ID NO 17
<211> LENGTH: 36
<212> TYPE: DNA
<213> ORGANISM: Artificial Sequence
<220> FEATURE:
<223> OTHER INFORMATION: Synthetic: primer

<400> SEQUENCE: 17
aatagtttga ccaacggcgc ctttggctcc gagaac                         36

<210> SEQ ID NO 18
<211> LENGTH: 36
<212> TYPE: DNA
<213> ORGANISM: Artificial Sequence
<220> FEATURE:
<223> OTHER INFORMATION: Synthetic: primer

<400> SEQUENCE: 18
ctcggagcca aaggcgccgt tggtcaaact attgtg                         36

<210> SEQ ID NO 19
<211> LENGTH: 36
<212> TYPE: DNA
<213> ORGANISM: Artificial Sequence
<220> FEATURE:
<223> OTHER INFORMATION: Synthetic: primer

<400> SEQUENCE: 19
aatagtttga ccaacaacgc ctttggctcc gagaac                         36

<210> SEQ ID NO 20
<211> LENGTH: 36
<212> TYPE: DNA
<213> ORGANISM: Artificial Sequence
<220> FEATURE:
<223> OTHER INFORMATION: Synthetic: primer

<400> SEQUENCE: 20
ctcggagcca aaggcgttgt tggtcaaact attgtg                         36

<210> SEQ ID NO 21
<211> LENGTH: 36
<212> TYPE: DNA
<213> ORGANISM: Artificial Sequence
<220> FEATURE:
<223> OTHER INFORMATION: Synthetic: primer

<400> SEQUENCE: 21
aatagtttga ccaacgaggc ctttggctcc gagaac                         36

<210> SEQ ID NO 22
<211> LENGTH: 36
<212> TYPE: DNA
<213> ORGANISM: Artificial Sequence
<220> FEATURE:
<223> OTHER INFORMATION: Synthetic: primer

<400> SEQUENCE: 22
ctcggagcca aaggcctcgt tggtcaaact attgtg        36

<210> SEQ ID NO 23
<211> LENGTH: 36
<212> TYPE: DNA
<213> ORGANISM: Artificial Sequence
<220> FEATURE:
<223> OTHER INFORMATION: Synthetic: primer

<400> SEQUENCE: 23
aatagtttga ccaacgatgc ctttggctcc gagaac        36

<210> SEQ ID NO 24
<211> LENGTH: 36
<212> TYPE: DNA
<213> ORGANISM: Artificial Sequence
<220> FEATURE:
<223> OTHER INFORMATION: Synthetic: primer

<400> SEQUENCE: 24
ctcggagcca aaggcatcgt tggtcaaact attgtg        36

<210> SEQ ID NO 25
<211> LENGTH: 36
<212> TYPE: DNA
<213> ORGANISM: Artificial Sequence
<220> FEATURE:
<223> OTHER INFORMATION: Synthetic: primer

<400> SEQUENCE: 25
aatagtttga ccaaccatgc ctttggctcc gagaac        36

<210> SEQ ID NO 26
<211> LENGTH: 36
<212> TYPE: DNA
<213> ORGANISM: Artificial Sequence
<220> FEATURE:
<223> OTHER INFORMATION: Synthetic: primer

<400> SEQUENCE: 26
ctcggagcca aaggcatggt tggtcaaact attgtg        36

<210> SEQ ID NO 27
<211> LENGTH: 36
<212> TYPE: DNA
<213> ORGANISM: Artificial Sequence
<220> FEATURE:
<223> OTHER INFORMATION: Synthetic: primer

<400> SEQUENCE: 27
aatagtttga ccaacgaagc ctttggctcc gagaac        36

<210> SEQ ID NO 28
<211> LENGTH: 36
<212> TYPE: DNA
<213> ORGANISM: Artificial Sequence
<220> FEATURE:
<223> OTHER INFORMATION: Synthetic: primer

<400> SEQUENCE: 28
ctcggagcca aaggcttcgt tggtcaaact attgtg        36

<210> SEQ ID NO 29

<211> LENGTH: 36
<212> TYPE: DNA
<213> ORGANISM: Artificial Sequence
<220> FEATURE:
<223> OTHER INFORMATION: Synthetic: primer

<400> SEQUENCE: 29
aatagtttga ccaacccagc ctttggctcc gagaac                         36

<210> SEQ ID NO 30
<211> LENGTH: 36
<212> TYPE: DNA
<213> ORGANISM: Artificial Sequence
<220> FEATURE:
<223> OTHER INFORMATION: Synthetic: primer

<400> SEQUENCE: 30
ctcggagcca aaggctgggt tggtcaaact attgtg                         36

<210> SEQ ID NO 31
<211> LENGTH: 36
<212> TYPE: DNA
<213> ORGANISM: Artificial Sequence
<220> FEATURE:
<223> OTHER INFORMATION: Synthetic: primer

<400> SEQUENCE: 31
aatagtttga ccaacagggc ctttggctcc gagaac                         36

<210> SEQ ID NO 32
<211> LENGTH: 36
<212> TYPE: DNA
<213> ORGANISM: Artificial Sequence
<220> FEATURE:
<223> OTHER INFORMATION: Synthetic: primer

<400> SEQUENCE: 32
ctcggagcca aaggccctgt tggtcaaact attgtg                         36

<210> SEQ ID NO 33
<211> LENGTH: 36
<212> TYPE: DNA
<213> ORGANISM: Artificial Sequence
<220> FEATURE:
<223> OTHER INFORMATION: Synthetic: primer

<400> SEQUENCE: 33
aatagtttga ccaacgctgc ctttggctcc gagaac                         36

<210> SEQ ID NO 34
<211> LENGTH: 36
<212> TYPE: DNA
<213> ORGANISM: Artificial Sequence
<220> FEATURE:
<223> OTHER INFORMATION: Synthetic: primer

<400> SEQUENCE: 34
ctcggagcca aaggcagcgt tggtcaaact attgtg                         36

<210> SEQ ID NO 35
<211> LENGTH: 36
<212> TYPE: DNA
<213> ORGANISM: Artificial Sequence
<220> FEATURE:
<223> OTHER INFORMATION: Synthetic: primer

<400> SEQUENCE: 35
aatagtttga ccaacagtgc ctttggctcc gagaac                                    36

<210> SEQ ID NO 36
<211> LENGTH: 36
<212> TYPE: DNA
<213> ORGANISM: Artificial Sequence
<220> FEATURE:
<223> OTHER INFORMATION: Synthetic: primer

<400> SEQUENCE: 36
ctcggagcca aaggcactgt tggtcaaact attgtg                                    36

<210> SEQ ID NO 37
<211> LENGTH: 36
<212> TYPE: DNA
<213> ORGANISM: Artificial Sequence
<220> FEATURE:
<223> OTHER INFORMATION: Synthetic: primer

<400> SEQUENCE: 37
aatagtttga ccaacgcagc ctttggctcc gagaac                                    36

<210> SEQ ID NO 38
<211> LENGTH: 36
<212> TYPE: DNA
<213> ORGANISM: Artificial Sequence
<220> FEATURE:
<223> OTHER INFORMATION: Synthetic: primer

<400> SEQUENCE: 38
ctcggagcca aaggctgcgt tggtcaaact attgtg                                    36

<210> SEQ ID NO 39
<211> LENGTH: 36
<212> TYPE: DNA
<213> ORGANISM: Artificial Sequence
<220> FEATURE:
<223> OTHER INFORMATION: Synthetic: primer

<400> SEQUENCE: 39
aatagtttga ccaacatagc ctttggctcc gagaac                                    36

<210> SEQ ID NO 40
<211> LENGTH: 36
<212> TYPE: DNA
<213> ORGANISM: Artificial Sequence
<220> FEATURE:
<223> OTHER INFORMATION: Synthetic: primer

<400> SEQUENCE: 40
ctcggagcca aaggctatgt tggtcaaact attgtg                                    36

<210> SEQ ID NO 41
<211> LENGTH: 36
<212> TYPE: DNA
<213> ORGANISM: Artificial Sequence
<220> FEATURE:
<223> OTHER INFORMATION: Synthetic: primer

<400> SEQUENCE: 41
aatagtttga ccaacttggc ctttggctcc gagaac                                    36

<210> SEQ ID NO 42
<211> LENGTH: 36
<212> TYPE: DNA

<213> ORGANISM: Artificial Sequence
<220> FEATURE:
<223> OTHER INFORMATION: Synthetic: primer

<400> SEQUENCE: 42
ctcggagcca aaggccaagt tggtcaaact attgtg      36

<210> SEQ ID NO 43
<211> LENGTH: 36
<212> TYPE: DNA
<213> ORGANISM: Artificial Sequence
<220> FEATURE:
<223> OTHER INFORMATION: Synthetic: primer

<400> SEQUENCE: 43
aatagtttga ccaacgtcgc ctttggctcc gagaac      36

<210> SEQ ID NO 44
<211> LENGTH: 36
<212> TYPE: DNA
<213> ORGANISM: Artificial Sequence
<220> FEATURE:
<223> OTHER INFORMATION: Synthetic: primer

<400> SEQUENCE: 44
ctcggagcca aaggcgacgt tggtcaaact attgtg      36

<210> SEQ ID NO 45
<211> LENGTH: 36
<212> TYPE: DNA
<213> ORGANISM: Artificial Sequence
<220> FEATURE:
<223> OTHER INFORMATION: Synthetic: primer

<400> SEQUENCE: 45
aatagtttga ccaacctcgc ctttggctcc gagaac      36

<210> SEQ ID NO 46
<211> LENGTH: 36
<212> TYPE: DNA
<213> ORGANISM: Artificial Sequence
<220> FEATURE:
<223> OTHER INFORMATION: Synthetic: primer

<400> SEQUENCE: 46
ctcggagcca aaggcgaggt tggtcaaact attgtg      36

<210> SEQ ID NO 47
<211> LENGTH: 36
<212> TYPE: DNA
<213> ORGANISM: Artificial Sequence
<220> FEATURE:
<223> OTHER INFORMATION: Synthetic: primer

<400> SEQUENCE: 47
ctcggagcca aaggcgaggt tggtcaaact attgtg      36

<210> SEQ ID NO 48
<211> LENGTH: 36
<212> TYPE: DNA
<213> ORGANISM: Artificial Sequence
<220> FEATURE:
<223> OTHER INFORMATION: Synthetic: primer

<400> SEQUENCE: 48
ctcggagcca aaggcaaggt tggtcaaact attgtg      36

```
<210> SEQ ID NO 49
<211> LENGTH: 36
<212> TYPE: DNA
<213> ORGANISM: Artificial Sequence
<220> FEATURE:
<223> OTHER INFORMATION: Synthetic: primer

<400> SEQUENCE: 49
aatagtttga ccaacgtggc ctttggctcc gagaac                                    36

<210> SEQ ID NO 50
<211> LENGTH: 36
<212> TYPE: DNA
<213> ORGANISM: Artificial Sequence
<220> FEATURE:
<223> OTHER INFORMATION: Synthetic: primer

<400> SEQUENCE: 50
ctcggagcca aaggccacgt tggtcaaact attgtg                                    36

<210> SEQ ID NO 51
<211> LENGTH: 248
<212> TYPE: PRT
<213> ORGANISM: Artificial Sequence
<220> FEATURE:
<223> OTHER INFORMATION: Synthetic: ATCC13869 dapB aa seq.

<400> SEQUENCE: 51
```

Met Gly Ile Lys Val Gly Val Leu Gly Ala Lys Gly Arg Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Asp Leu Ser Leu Leu Val Asp Asn Gly Ala
        35                  40                  45

Glu Val Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

Phe Asp Asp Ala Arg Leu Glu Gln Val Arg Ala Trp Leu Glu Gly Lys
                85                  90                  95

Asp Asn Val Gly Val Leu Ile Ala Pro Asn Phe Ala Ile Ser Ala Val
            100                 105                 110

Leu Thr Met Val Phe Ser Lys Gln Ala Ala Arg Phe Phe Glu Ser Ala
        115                 120                 125

Glu Val Ile Glu Leu His His Pro Asn Lys Leu Asp Ala Pro Ser Gly
    130                 135                 140

Thr Ala Ile His Thr Ala Gln Gly Ile Ala Ala Ala Arg Lys Glu Ala
145                 150                 155                 160

Gly Met Asp Ala Gln Pro Asp Ala Thr Glu Gln Ala Leu Glu Gly Ser
                165                 170                 175

Arg Gly Ala Ser Val Asp Gly Ile Pro Val His Ala Val Arg Met Ser
            180                 185                 190

Gly Met Val Ala His Glu Gln Val Ile Phe Gly Thr Gln Gly Gln Thr
        195                 200                 205

Leu Thr Ile Lys Gln Asp Ser Tyr Asp Arg Asn Ser Phe Ala Pro Gly
    210                 215                 220

Val Leu Val Gly Val Arg Asn Ile Ala Gln His Pro Gly Leu Val Val
225                 230                 235                 240

Gly Leu Glu His Tyr Leu Gly Leu
             245

<210> SEQ ID NO 52
<211> LENGTH: 747
<212> TYPE: DNA
<213> ORGANISM: Artificial Sequence
<220> FEATURE:
<223> OTHER INFORMATION: Synthetic: ATCC13869 dapB nt seq.

<400> SEQUENCE: 52

| | | | | | |
|---|---|---|---|---|---|
| atgggaatca | aggttggcgt | tctcggagcc | aaaggccgtg | ttggtcaaac | tattgtggca | 60 |
| gcagtcaatg | agtccgacga | tctggagctt | gttgcagaga | tcggcgtcga | cgatgatttg | 120 |
| agccttctgg | tagacaacgg | cgctgaagtt | gtcgttgact | tcaccactcc | taacgctgtg | 180 |
| atgggcaacc | tggagttctg | catcaacaac | ggcatttctg | cggttgttgg | aaccacgggc | 240 |
| ttcgatgatg | ctcgtttgga | gcaggttcgc | gcctggcttg | aaggaaaaga | caatgtcggt | 300 |
| gttctgatcg | cacctaactt | tgctatctct | gcggtgttga | ccatggtctt | tccaagcag | 360 |
| gctgcccgct | tcttcgaatc | agctgaagtt | attgagctgc | accacccaa | caagctggat | 420 |
| gcaccttcag | gcaccgcgat | ccacactgct | cagggcattg | ctgcggcacg | caagaagca | 480 |
| ggcatggacg | cacagccaga | tgcgaccgag | caggcacttg | agggttcccg | tggcgcaagc | 540 |
| gtagatggaa | tcccagttca | cgcagtccgc | atgtccggca | tggttgctca | cgagcaagtt | 600 |
| atctttggca | cccagggtca | gaccttgacc | atcaagcagg | actcctatga | tcgcaactca | 660 |
| tttgcaccag | tgtcttggt | gggtgtgcgc | aacattgcac | agcacccagg | cctagtcgta | 720 |
| ggacttgagc | attacctagg | cctgtaa | | | | 747 |

<210> SEQ ID NO 53
<211> LENGTH: 248
<212> TYPE: PRT
<213> ORGANISM: Artificial Sequence
<220> FEATURE:
<223> OTHER INFORMATION: Synthetic: ATCC13869 dapB variant aa seq.

<400> SEQUENCE: 53

Met Gly Ile Lys Val Gly Val Leu Gly Ala Lys Gly Asn Val Gly Gln
1               5                   10                  15

Thr Ile Val Ala Ala Val Asn Glu Ser Asp Asp Leu Glu Leu Val Ala
            20                  25                  30

Glu Ile Gly Val Asp Asp Leu Ser Leu Leu Val Asp Asn Gly Ala
        35                  40                  45

Glu Val Val Val Asp Phe Thr Thr Pro Asn Ala Val Met Gly Asn Leu
    50                  55                  60

Glu Phe Cys Ile Asn Asn Gly Ile Ser Ala Val Val Gly Thr Thr Gly
65                  70                  75                  80

Phe Asp Asp Ala Arg Leu Glu Gln Val Arg Ala Trp Leu Glu Gly Lys
                85                  90                  95

Asp Asn Val Gly Val Leu Ile Ala Pro Asn Phe Ala Ile Ser Ala Val
            100                 105                 110

Leu Thr Met Val Phe Ser Lys Gln Ala Ala Arg Phe Phe Glu Ser Ala
        115                 120                 125

Glu Val Ile Glu Leu His His Pro Asn Lys Leu Asp Ala Pro Ser Gly
    130                 135                 140

Thr Ala Ile His Thr Ala Gln Gly Ile Ala Ala Ala Arg Lys Glu Ala
145                 150                 155                 160

```
Gly Met Asp Ala Gln Pro Asp Ala Thr Glu Gln Ala Leu Glu Gly Ser
                165                 170                 175

Arg Gly Ala Ser Val Asp Gly Ile Pro Val His Ala Val Arg Met Ser
            180                 185                 190

Gly Met Val Ala His Glu Gln Val Ile Phe Gly Thr Gln Gly Gln Thr
        195                 200                 205

Leu Thr Ile Lys Gln Asp Ser Tyr Asp Arg Asn Ser Phe Ala Pro Gly
    210                 215                 220

Val Leu Val Gly Val Arg Asn Ile Ala Gln His Pro Gly Leu Val Val
225                 230                 235                 240

Gly Leu Glu His Tyr Leu Gly Leu
                245

<210> SEQ ID NO 54
<211> LENGTH: 747
<212> TYPE: DNA
<213> ORGANISM: Artificial Sequence
<220> FEATURE:
<223> OTHER INFORMATION: Synthetic: ATCC13869 dapB variant nt seq.

<400> SEQUENCE: 54
atgggaatca aggttggcgt tctcggagcc aaaggcaacg ttggtcaaac tattgtggca      60
gcagtcaatg agtccgacga tctggagctt gttgcagaga tcggcgtcga cgatgatttg     120
agccttctgg tagacaacgg cgctgaagtt gtcgttgact tcaccactcc taacgctgtg     180
atgggcaacc tggagttctg catcaacaac ggcatttctg cggttgttgg aaccacgggc     240
ttcgatgatg ctcgtttgga gcaggttcgc gcctggcttg aaggaaaaga caatgtcggt     300
gttctgatcg cacctaactt tgctatctct gcggtgttga ccatggtctt ttccaagcag     360
gctgcccgct tcttcgaatc agctgaagtt attgagctgc accaccccaa caagctggat     420
gcaccttcag gcaccgcgat ccacactgct cagggcattg ctgcggcacg caaagaagca     480
ggcatggacg cacagccaga tgcgaccgag caggcacttg agggttcccg tggcgcaagc     540
gtagatggaa tcccagttca cgcagtccgc atgtccggca tggttgctca cgagcaagtt     600
atctttggca cccagggtca gaccttgacc atcaagcagg actcctatga tcgcaactca     660
tttgcaccag tgtcttggt gggtgtgcgc aacattgcac agcacccagg cctagtcgta     720
ggacttgagc attacctagg cctgtaa                                         747

<210> SEQ ID NO 55
<211> LENGTH: 421
<212> TYPE: PRT
<213> ORGANISM: Artificial Sequence
<220> FEATURE:
<223> OTHER INFORMATION: Synthetic: lysC variant aa seq.

<400> SEQUENCE: 55

Val Ala Leu Val Val Gln Lys Tyr Gly Gly Ser Ser Leu Glu Ser Ala
1               5                   10                  15

Glu Arg Ile Arg Asn Val Ala Glu Arg Ile Val Ala Thr Lys Lys Ala
            20                  25                  30

Gly Asn Asp Val Val Val Val Cys Ser Ala Met Gly Asp Thr Thr Asp
        35                  40                  45

Glu Leu Leu Glu Leu Ala Ala Ala Val Asn Pro Val Pro Pro Ala Arg
    50                  55                  60

Glu Met Asp Met Leu Leu Thr Ala Gly Glu Arg Ile Ser Asn Ala Leu
65                  70                  75                  80
```

```
Val Ala Met Ala Ile Glu Ser Leu Gly Ala Glu Ala Gln Ser Phe Thr
                85                  90                  95

Gly Ser Gln Ala Gly Val Leu Thr Thr Glu Arg His Gly Asn Ala Arg
            100                 105                 110

Ile Val Asp Val Thr Pro Gly Arg Val Arg Glu Ala Leu Asp Glu Gly
        115                 120                 125

Lys Ile Cys Ile Val Ala Gly Phe Gln Gly Val Asn Lys Glu Thr Arg
130                 135                 140

Asp Val Thr Thr Leu Gly Arg Gly Gly Ser Asp Thr Thr Ala Val Ala
145                 150                 155                 160

Leu Ala Ala Ala Leu Asn Ala Asp Val Cys Glu Ile Tyr Ser Asp Val
                165                 170                 175

Asp Gly Val Tyr Thr Ala Asp Pro Arg Ile Val Pro Asn Ala Gln Lys
            180                 185                 190

Leu Glu Lys Leu Ser Phe Glu Glu Met Leu Glu Leu Ala Ala Val Gly
        195                 200                 205

Ser Lys Ile Leu Val Leu Arg Ser Val Glu Tyr Ala Arg Ala Phe Asn
210                 215                 220

Val Pro Leu Arg Val Arg Ser Ser Tyr Ser Asn Asp Pro Gly Thr Leu
225                 230                 235                 240

Ile Ala Gly Ser Met Glu Asp Ile Pro Val Glu Glu Ala Val Leu Thr
                245                 250                 255

Gly Val Ala Thr Asp Lys Ser Glu Ala Lys Val Thr Val Leu Gly Ile
            260                 265                 270

Ser Asp Lys Pro Gly Glu Ala Ala Lys Val Phe Arg Ala Leu Ala Asp
        275                 280                 285

Ala Glu Ile Asn Ile Asp Met Val Leu Gln Asn Val Ser Ser Val Glu
290                 295                 300

Asp Gly Thr Thr Asp Ile Thr Phe Thr Cys Pro Arg Ser Asp Gly Arg
305                 310                 315                 320

Arg Ala Met Glu Ile Leu Lys Lys Leu Gln Val Gln Gly Asn Trp Thr
                325                 330                 335

Asn Val Leu Tyr Asp Asp Gln Val Gly Lys Val Ser Leu Val Gly Ala
            340                 345                 350

Gly Met Lys Ser His Pro Gly Val Thr Ala Glu Phe Met Glu Ala Leu
        355                 360                 365

Arg Asp Val Asn Val Asn Ile Glu Lys Ile Ser Thr Ser Glu Ile Arg
370                 375                 380

Ile Ser Val Leu Ile Arg Glu Asp Asp Leu Asp Ala Ala Ala Arg Ala
385                 390                 395                 400

Leu His Glu Gln Phe Gln Leu Gly Gly Glu Asp Glu Ala Val Val Tyr
                405                 410                 415

Ala Gly Thr Gly Arg
            420

<210> SEQ ID NO 56
<211> LENGTH: 34
<212> TYPE: DNA
<213> ORGANISM: Artificial Sequence
<220> FEATURE:
<223> OTHER INFORMATION: Synthetic: primer

<400> SEQUENCE: 56
tcgagctcgg tacccgctgc gcagtgttga atac                              34
```

```
<210> SEQ ID NO 57
<211> LENGTH: 34
<212> TYPE: DNA
<213> ORGANISM: Artificial Sequence
<220> FEATURE:
<223> OTHER INFORMATION: Synthetic: primer

<400> SEQUENCE: 57
ctctagagga tccccgttca cctcagagac gatt                              34

<210> SEQ ID NO 58
<211> LENGTH: 30
<212> TYPE: DNA
<213> ORGANISM: Artificial Sequence
<220> FEATURE:
<223> OTHER INFORMATION: Synthetic: primer

<400> SEQUENCE: 58
tggaaatctt ttcgatgttc acgttgacat                                   30

<210> SEQ ID NO 59
<211> LENGTH: 29
<212> TYPE: DNA
<213> ORGANISM: Artificial Sequence
<220> FEATURE:
<223> OTHER INFORMATION: Synthetic: primer

<400> SEQUENCE: 59
atgtcaacgt gaacatcgaa aagatttcc                                    29

<210> SEQ ID NO 60
<211> LENGTH: 445
<212> TYPE: PRT
<213> ORGANISM: Artificial Sequence
<220> FEATURE:
<223> OTHER INFORMATION: Synthetic: hom variant aa seq.

<400> SEQUENCE: 60
```

Met Thr Ser Ala Ser Ala Pro Ser Phe Asn Pro Gly Lys Gly Pro Gly
1               5                   10                  15

Ser Ala Val Gly Ile Ala Leu Leu Gly Phe Gly Thr Val Gly Thr Glu
            20                  25                  30

Val Met Arg Leu Met Thr Glu Tyr Gly Asp Glu Leu Ala His Arg Ile
        35                  40                  45

Gly Gly Pro Leu Glu Val Arg Gly Ile Ala Val Ser Asp Ile Ser Lys
    50                  55                  60

Pro Arg Glu Gly Val Ala Pro Glu Leu Leu Thr Glu Asp Ala Phe Ala
65                  70                  75                  80

Leu Ile Glu Arg Glu Asp Val Asp Ile Val Glu Val Ile Gly Gly
                85                  90                  95

Ile Glu Tyr Pro Arg Glu Val Val Leu Ala Ala Leu Lys Ala Gly Lys
            100                 105                 110

Ser Val Val Thr Ala Asn Lys Ala Leu Val Ala Ala His Ser Ala Glu
        115                 120                 125

Leu Ala Asp Ala Ala Glu Ala Ala Asn Val Asp Leu Tyr Phe Glu Ala
    130                 135                 140

Ala Val Ala Gly Ala Ile Pro Val Val Gly Pro Leu Arg Arg Ser Leu
145                 150                 155                 160

Ala Gly Asp Gln Ile Gln Ser Val Met Gly Ile Val Asn Gly Thr Thr
                165                 170                 175

Asn Phe Ile Leu Asp Ala Met Asp Ser Thr Gly Ala Asp Tyr Ala Asp
                180                 185                 190

Ser Leu Ala Glu Ala Thr Arg Leu Gly Tyr Ala Glu Ala Asp Pro Thr
            195                 200                 205

Ala Asp Val Glu Gly His Asp Ala Ala Ser Lys Ala Ala Ile Leu Ala
        210                 215                 220

Ser Ile Ala Phe His Thr Arg Val Thr Ala Asp Asp Val Tyr Cys Glu
225                 230                 235                 240

Gly Ile Ser Asn Ile Ser Ala Ala Asp Ile Glu Ala Ala Gln Gln Ala
                245                 250                 255

Gly His Thr Ile Lys Leu Leu Ala Ile Cys Gly Lys Phe Thr Asn Lys
            260                 265                 270

Glu Gly Lys Ser Ala Ile Ser Ala Arg Val His Pro Thr Leu Leu Pro
        275                 280                 285

Val Ser His Pro Leu Ala Ser Val Asn Lys Ser Phe Asn Ala Ile Phe
290                 295                 300

Val Glu Ala Glu Ala Ala Gly Arg Leu Met Phe Tyr Gly Asn Gly Ala
305                 310                 315                 320

Gly Gly Ala Pro Thr Ala Ser Ala Val Leu Gly Asp Val Val Gly Ala
                325                 330                 335

Ala Arg Asn Lys Val His Gly Arg Ala Pro Gly Glu Ser Thr Tyr
            340                 345                 350

Ala Asn Leu Pro Ile Ala Asp Phe Gly Glu Thr Thr Arg Tyr His
        355                 360                 365

Leu Asp Met Asp Val Glu Asp Arg Val Gly Val Leu Ala Glu Leu Ala
370                 375                 380

Ser Leu Phe Ser Glu Gln Gly Ile Ser Leu Arg Thr Ile Arg Gln Glu
385                 390                 395                 400

Glu Arg Asp Asp Asp Ala His Leu Ile Val Val Thr His Ser Ala Leu
                405                 410                 415

Glu Ser Asp Leu Ser Arg Thr Val Glu Leu Leu Lys Ala Lys Pro Val
            420                 425                 430

Val Lys Ala Ile Asn Ser Val Ile Arg Leu Glu Arg Asp
        435                 440                 445

<210> SEQ ID NO 61
<211> LENGTH: 34
<212> TYPE: DNA
<213> ORGANISM: Artificial Sequence
<220> FEATURE:
<223> OTHER INFORMATION: Synthetic: primer

<400> SEQUENCE: 61
atcctctaga gtcgacccaa ctgcagacgt cgaa                         34

<210> SEQ ID NO 62
<211> LENGTH: 35
<212> TYPE: DNA
<213> ORGANISM: Artificial Sequence
<220> FEATURE:
<223> OTHER INFORMATION: Synthetic: primer

<400> SEQUENCE: 62
atgcctgcag gtcgacatag acagatttgt ccacg                        35

<210> SEQ ID NO 63
<211> LENGTH: 35
<212> TYPE: DNA

```
<213> ORGANISM: Artificial Sequence
<220> FEATURE:
<223> OTHER INFORMATION: Synthetic: primer

<400> SEQUENCE: 63
gtgaccacga tcagatgtgc atcatcatcg cgctc                                35

<210> SEQ ID NO 64
<211> LENGTH: 35
<212> TYPE: DNA
<213> ORGANISM: Artificial Sequence
<220> FEATURE:
<223> OTHER INFORMATION: Synthetic: primer

<400> SEQUENCE: 64
gcgatgatga tgcacatctg atcgtggtca cccac                                35

<210> SEQ ID NO 65
<211> LENGTH: 301
<212> TYPE: PRT
<213> ORGANISM: Artificial Sequence
<220> FEATURE:
<223> OTHER INFORMATION: Synthetic: dapA variant aa seq.

<400> SEQUENCE: 65
```

Met Ser Thr Gly Leu Thr Ala Lys Thr Gly Val Glu His Phe Gly Thr
1               5                   10                  15

Val Gly Val Ala Met Val Thr Pro Phe Thr Glu Ser Gly Asp Ile Asp
            20                  25                  30

Ile Ala Ala Gly Arg Glu Val Ala Ala Tyr Leu Val Asp Lys Gly Leu
        35                  40                  45

Asp Ser Leu Val Leu Ala Gly Thr Thr Gly Glu Ser Pro Thr Thr Thr
    50                  55                  60

Ala Ala Glu Lys Leu Glu Leu Leu Lys Ala Val Arg Glu Glu Val Gly
65                  70                  75                  80

Asp Arg Ala Lys Leu Ile Ala Gly Val Gly Thr Asn Asn Thr Arg Thr
                85                  90                  95

Ser Val Glu Leu Ala Glu Ala Ala Ala Ser Ala Gly Ala Asp Gly Leu
            100                 105                 110

Leu Val Val Thr Pro Tyr Phe Ser Lys Pro Ser Gln Glu Gly Leu Leu
        115                 120                 125

Ala His Phe Gly Ala Ile Ala Ala Thr Glu Val Pro Ile Cys Leu
    130                 135                 140

Tyr Asp Ile Pro Gly Arg Ser Gly Ile Pro Ile Glu Ser Asp Thr Met
145                 150                 155                 160

Arg Arg Leu Ser Glu Leu Pro Thr Ile Leu Ala Val Lys Asp Ala Lys
                165                 170                 175

Gly Asp Leu Val Ala Ala Thr Ser Leu Ile Lys Glu Thr Gly Leu Ala
            180                 185                 190

Trp Tyr Ser Gly Asp Asp Pro Leu Asn Leu Val Trp Leu Ala Leu Gly
        195                 200                 205

Gly Ser Gly Phe Ile Ser Val Ile Gly His Ala Ala Pro Thr Ala Leu
    210                 215                 220

Arg Glu Leu Tyr Thr Ser Phe Glu Glu Gly Asp Leu Val Arg Ala Arg
225                 230                 235                 240

Glu Ile Asn Ala Lys Leu Ser Pro Leu Val Ala Ala Gln Gly Arg Leu
                245                 250                 255

Gly Gly Val Ser Leu Ala Lys Ala Ala Leu Arg Leu Gln Gly Ile Asn

```
              260             265             270
Val Gly Asp Pro Arg Leu Pro Ile Met Ala Pro Asn Glu Gln Glu Leu
            275                 280                 285

Glu Ala Leu Arg Glu Asp Met Lys Lys Ala Gly Val Leu
        290                 295                 300
```

<210> SEQ ID NO 66
<211> LENGTH: 35
<212> TYPE: DNA
<213> ORGANISM: Artificial Sequence
<220> FEATURE:
<223> OTHER INFORMATION: Synthetic: primer

<400> SEQUENCE: 66
atcctctaga gtcgacatga gcacaggttt aacag                      35

<210> SEQ ID NO 67
<211> LENGTH: 35
<212> TYPE: DNA
<213> ORGANISM: Artificial Sequence
<220> FEATURE:
<223> OTHER INFORMATION: Synthetic: primer

<400> SEQUENCE: 67
atgcctgcag gtcgacttgc gggtaacctt ccggc                      35

<210> SEQ ID NO 68
<211> LENGTH: 35
<212> TYPE: DNA
<213> ORGANISM: Artificial Sequence
<220> FEATURE:
<223> OTHER INFORMATION: Synthetic: primer

<400> SEQUENCE: 68
ttggctcggc ttggaaaaat aaggagttac aacta                      35

<210> SEQ ID NO 69
<211> LENGTH: 36
<212> TYPE: DNA
<213> ORGANISM: Artificial Sequence
<220> FEATURE:
<223> OTHER INFORMATION: Synthetic: primer

<400> SEQUENCE: 69
gttgtaactc cttattttc caagccgagc caagag                      36

<210> SEQ ID NO 70
<211> LENGTH: 445
<212> TYPE: PRT
<213> ORGANISM: Artificial Sequence
<220> FEATURE:
<223> OTHER INFORMATION: Synthetic: lysA variant aa seq.

<400> SEQUENCE: 70

```
Met Ala Thr Val Glu Asn Phe Asn Glu Leu Pro Ala His Val Trp Pro
 1               5                  10                  15

Arg Asn Ala Val Arg Gln Glu Asp Gly Val Val Thr Val Ala Gly Val
                20                  25                  30

Pro Leu Pro Asp Leu Ala Glu Glu Tyr Gly Thr Pro Leu Phe Val Val
            35                  40                  45

Asp Glu Asp Asp Phe Arg Ser Arg Cys Arg Asp Met Ala Thr Ala Phe
        50                  55                  60

Gly Gly Pro Gly Asn Val His Tyr Ala Ser Lys Ala Phe Leu Thr Lys
```

```
                65                  70                  75                  80
        Thr Ile Ala Arg Trp Val Asp Glu Glu Gly Leu Ala Leu Asp Ile Ala
                        85                  90                  95

Ser Ile Asn Glu Leu Gly Ile Ala Leu Ala Ala Gly Phe Pro Ala Ser
                        100                 105                 110

Arg Ile Thr Ala His Gly Asn Lys Gly Val Glu Phe Leu Arg Ala
                        115                 120                 125

Leu Val Gln Asn Gly Val Gly His Val Val Leu Asp Ser Ala Gln Glu
        130                 135                 140

Leu Glu Leu Leu Asp Tyr Val Ala Ala Gly Glu Gly Lys Ile Gln Asp
        145                 150                 155                 160

Val Leu Ile Arg Val Lys Pro Gly Ile Glu Ala His Thr His Glu Phe
                        165                 170                 175

Ile Ala Thr Ser His Glu Asp Gln Lys Phe Gly Phe Ser Leu Ala Ser
                        180                 185                 190

Gly Ser Ala Phe Glu Ala Ala Lys Ala Ala Asn Asn Ala Glu Asn Leu
                        195                 200                 205

Asn Leu Val Gly Leu His Cys His Val Gly Ser Gln Val Phe Asp Ala
        210                 215                 220

Glu Gly Phe Lys Leu Ala Ala Glu Arg Val Leu Gly Leu Tyr Ser Gln
        225                 230                 235                 240

Ile His Ser Glu Leu Gly Val Ala Leu Pro Glu Leu Asp Leu Gly Gly
                        245                 250                 255

Gly Tyr Gly Ile Ala Tyr Thr Ala Ala Glu Glu Pro Leu Asn Val Ala
                        260                 265                 270

Glu Val Ala Ser Asp Leu Leu Thr Ala Val Gly Lys Met Ala Ala Glu
                        275                 280                 285

Leu Gly Ile Asp Ala Pro Thr Val Leu Val Glu Pro Gly Ala Ala Ile
                        290                 295                 300

Ala Gly Pro Ser Thr Val Thr Ile Tyr Glu Val Gly Thr Thr Lys Asp
        305                 310                 315                 320

Val His Val Asp Asp Lys Thr Arg Arg Tyr Ile Ala Val Asp Gly
                        325                 330                 335

Gly Met Ser Asp Asn Ile Arg Pro Ala Leu Tyr Gly Ser Glu Tyr Asp
                        340                 345                 350

Ala Arg Val Val Ser Arg Phe Ala Glu Gly Asp Pro Val Ser Thr Arg
                        355                 360                 365

Ile Val Gly Ser His Cys Glu Ser Gly Asp Ile Leu Ile Asn Asp Glu
        370                 375                 380

Ile Tyr Pro Ser Asp Ile Thr Ser Gly Asp Phe Leu Ala Leu Ala Ala
        385                 390                 395                 400

Thr Gly Ala Tyr Cys Tyr Ala Met Ser Ser Arg Tyr Asn Ala Phe Thr
                        405                 410                 415

Arg Pro Ala Val Val Ser Val Arg Ala Gly Ser Ser Arg Leu Met Leu
                        420                 425                 430

Arg Arg Glu Thr Leu Asp Asp Ile Leu Ser Leu Glu Ala
                        435                 440                 445

<210> SEQ ID NO 71
<211> LENGTH: 35
<212> TYPE: DNA
<213> ORGANISM: Artificial Sequence
<220> FEATURE:
<223> OTHER INFORMATION: Synthetic: primer
```

<400> SEQUENCE: 71
atcctctaga gtcgacgaca cgtggtgctg gactc        35

<210> SEQ ID NO 72
<211> LENGTH: 35
<212> TYPE: DNA
<213> ORGANISM: Artificial Sequence
<220> FEATURE:
<223> OTHER INFORMATION: Synthetic: primer

<400> SEQUENCE: 72
atgcctgcag gtcgacagaa acccagaaac ccaaa        35

<210> SEQ ID NO 73
<211> LENGTH: 35
<212> TYPE: DNA
<213> ORGANISM: Artificial Sequence
<220> FEATURE:
<223> OTHER INFORMATION: Synthetic: primer

<400> SEQUENCE: 73
gggcctgcga tagctgcgcc gggctcaaca agcac        35

<210> SEQ ID NO 74
<211> LENGTH: 35
<212> TYPE: DNA
<213> ORGANISM: Artificial Sequence
<220> FEATURE:
<223> OTHER INFORMATION: Synthetic: primer

<400> SEQUENCE: 74
ttgttgagcc cggcgcagct atcgcaggcc cctcc        35

<210> SEQ ID NO 75
<211> LENGTH: 318
<212> TYPE: PRT
<213> ORGANISM: Artificial Sequence
<220> FEATURE:
<223> OTHER INFORMATION: Synthetic: ddh variant aa seq.

<400> SEQUENCE: 75

Met Thr Asn Ile Arg Val Ala Ile Val Gly Tyr Gly Asn Leu Gly Arg
1               5                   10                  15

Ser Val Glu Lys Leu Ile Ala Lys Gln Pro Asp Met Asp Leu Val Gly
            20                  25                  30

Ile Phe Ser Arg Arg Ala Thr Leu Asp Thr Lys Thr Pro Val Phe Asp
        35                  40                  45

Val Ala Asp Val Asp Lys His Ala Asp Val Asp Val Leu Phe Leu
    50                  55                  60

Cys Met Gly Ser Ala Thr Asp Ile Pro Glu Gln Ala Pro Lys Phe Ala
65                  70                  75                  80

Gln Phe Ala Cys Thr Val Asp Thr Tyr Asp Asn His Arg Asp Ile Pro
                85                  90                  95

Arg His Arg Gln Val Met Asn Glu Ala Ala Thr Ala Ala Gly Asn Val
            100                 105                 110

Ala Leu Val Ser Thr Gly Trp Asp Pro Gly Met Phe Ser Ile Asn Arg
        115                 120                 125

Val Tyr Ala Ala Ala Val Leu Ala Glu His Gln Gln His Thr Phe Trp
    130                 135                 140

Gly Pro Gly Leu Ser Gln Gly His Ser Asp Ala Leu Arg Arg Ile Pro
145                 150                 155                 160

Gly Val Gln Lys Ala Val Gln Tyr Leu Leu Pro Ser Glu Asp Ala Leu
            165                 170                 175

Glu Lys Ala Arg Arg Gly Glu Ala Gly Asp Leu Thr Gly Lys Gln Thr
        180                 185                 190

His Lys Arg Gln Cys Phe Val Val Ala Asp Ala Asp His Glu Arg
        195                 200                 205

Ile Glu Asn Asp Ile Arg Thr Met Pro Asp Tyr Phe Val Gly Tyr Glu
        210                 215                 220

Val Glu Val Asn Phe Ile Asp Glu Ala Thr Phe Asp Ser Glu His Thr
225                 230                 235                 240

Gly Met Pro His Gly His Val Ile Thr Thr Gly Asp Thr Gly Gly
            245                 250                 255

Phe Asn His Thr Val Glu Tyr Ile Leu Lys Leu Asp Arg Asn Pro Asp
            260                 265                 270

Phe Thr Ala Ser Ser Gln Ile Ala Phe Gly Arg Ala Ala His Arg Met
        275                 280                 285

Lys Gln Gln Gly Gln Ser Gly Ala Phe Thr Val Leu Glu Val Ala Pro
        290                 295                 300

Tyr Leu Leu Ser Pro Glu Asn Leu Asp Asp Leu Ile Ala Arg
305                 310                 315

<210> SEQ ID NO 76
<211> LENGTH: 34
<212> TYPE: DNA
<213> ORGANISM: Artificial Sequence
<220> FEATURE:
<223> OTHER INFORMATION: Synthetic: primer

<400> SEQUENCE: 76
atcctctaga gtcgacccaa catccgcgta gcta                                34

<210> SEQ ID NO 77
<211> LENGTH: 34
<212> TYPE: DNA
<213> ORGANISM: Artificial Sequence
<220> FEATURE:
<223> OTHER INFORMATION: Synthetic: primer

<400> SEQUENCE: 77
atgcctgcag gtcgacaaga ggcaaggaaa ccac                                34

<210> SEQ ID NO 78
<211> LENGTH: 36
<212> TYPE: DNA
<213> ORGANISM: Artificial Sequence
<220> FEATURE:
<223> OTHER INFORMATION: Synthetic: primer

<400> SEQUENCE: 78
gtcttcggat gggaggaggt actggactgc cttttg                              36

<210> SEQ ID NO 79
<211> LENGTH: 36
<212> TYPE: DNA
<213> ORGANISM: Artificial Sequence
<220> FEATURE:
<223> OTHER INFORMATION: Synthetic: primer

<400> SEQUENCE: 79
aaggcagtcc agtacctcct cccatccgaa gacgcc                              36

<210> SEQ ID NO 80
<211> LENGTH: 301
<212> TYPE: PRT
<213> ORGANISM: Artificial Sequence
<220> FEATURE:
<223> OTHER INFORMATION: Synthetic: dapA aa seq.

<400> SEQUENCE: 80

```
Met Ser Thr Gly Leu Thr Ala Lys Thr Gly Val Glu His Phe Gly Thr
1               5                   10                  15

Val Gly Val Ala Met Val Thr Pro Phe Thr Glu Ser Gly Asp Ile Asp
            20                  25                  30

Ile Ala Ala Gly Arg Glu Val Ala Ala Tyr Leu Val Asp Lys Gly Leu
        35                  40                  45

Asp Ser Leu Val Leu Ala Gly Thr Thr Gly Glu Ser Pro Thr Thr Thr
    50                  55                  60

Ala Ala Glu Lys Leu Glu Leu Leu Lys Ala Val Arg Glu Glu Val Gly
65                  70                  75                  80

Asp Arg Ala Lys Leu Ile Ala Gly Val Gly Thr Asn Asn Thr Arg Thr
                85                  90                  95

Ser Val Glu Leu Ala Glu Ala Ala Ser Ala Gly Ala Asp Gly Leu
            100                 105                 110

Leu Val Val Thr Pro Tyr Tyr Ser Lys Pro Ser Gln Glu Gly Leu Leu
        115                 120                 125

Ala His Phe Gly Ala Ile Ala Ala Thr Glu Val Pro Ile Cys Leu
    130                 135                 140

Tyr Asp Ile Pro Gly Arg Ser Gly Ile Pro Ile Glu Ser Asp Thr Met
145                 150                 155                 160

Arg Arg Leu Ser Glu Leu Pro Thr Ile Leu Ala Val Lys Asp Ala Lys
                165                 170                 175

Gly Asp Leu Val Ala Ala Thr Ser Leu Ile Lys Glu Thr Gly Leu Ala
            180                 185                 190

Trp Tyr Ser Gly Asp Asp Pro Leu Asn Leu Val Trp Leu Ala Leu Gly
        195                 200                 205

Gly Ser Gly Phe Ile Ser Val Ile Gly His Ala Ala Pro Thr Ala Leu
    210                 215                 220

Arg Glu Leu Tyr Thr Ser Phe Glu Glu Gly Asp Leu Val Arg Ala Arg
225                 230                 235                 240

Glu Ile Asn Ala Lys Leu Ser Pro Leu Val Ala Ala Gln Gly Arg Leu
                245                 250                 255

Gly Gly Val Ser Leu Ala Lys Ala Ala Leu Arg Leu Gln Gly Ile Asn
            260                 265                 270

Val Gly Asp Pro Arg Leu Pro Ile Met Ala Pro Asn Glu Gln Glu Leu
        275                 280                 285

Glu Ala Leu Arg Glu Asp Met Lys Lys Ala Gly Val Leu
    290                 295                 300
```

<210> SEQ ID NO 81
<211> LENGTH: 445
<212> TYPE: PRT
<213> ORGANISM: Artificial Sequence
<220> FEATURE:
<223> OTHER INFORMATION: Synthetic: lysA aa seq.

<400> SEQUENCE: 81

```
Met Ala Thr Val Glu Asn Phe Asn Glu Leu Pro Ala His Val Trp Pro
1               5                   10                  15
```

-continued

Arg Asn Ala Val Arg Gln Glu Asp Gly Val Thr Val Ala Gly Val
            20                  25                  30

Pro Leu Pro Asp Leu Ala Glu Tyr Gly Thr Pro Leu Phe Val Val
        35                  40                  45

Asp Glu Asp Phe Arg Ser Arg Cys Arg Asp Met Ala Thr Ala Phe
50                  55                  60

Gly Gly Pro Gly Asn Val His Tyr Ala Ser Lys Ala Phe Leu Thr Lys
65                  70                  75                  80

Thr Ile Ala Arg Trp Val Asp Glu Glu Gly Leu Ala Leu Asp Ile Ala
                85                  90                  95

Ser Ile Asn Glu Leu Gly Ile Ala Leu Ala Gly Phe Pro Ala Ser
            100                 105                 110

Arg Ile Thr Ala His Gly Asn Asn Lys Gly Val Glu Phe Leu Arg Ala
        115                 120                 125

Leu Val Gln Asn Gly Val Gly His Val Val Leu Asp Ser Ala Gln Glu
130                 135                 140

Leu Glu Leu Leu Asp Tyr Val Ala Ala Gly Glu Gly Lys Ile Gln Asp
145                 150                 155                 160

Val Leu Ile Arg Val Lys Pro Gly Ile Glu Ala His Thr His Glu Phe
                165                 170                 175

Ile Ala Thr Ser His Glu Asp Gln Lys Phe Gly Phe Ser Leu Ala Ser
            180                 185                 190

Gly Ser Ala Phe Glu Ala Ala Lys Ala Ala Asn Asn Ala Glu Asn Leu
        195                 200                 205

Asn Leu Val Gly Leu His Cys His Val Gly Ser Gln Val Phe Asp Ala
210                 215                 220

Glu Gly Phe Lys Leu Ala Ala Glu Arg Val Leu Gly Leu Tyr Ser Gln
225                 230                 235                 240

Ile His Ser Glu Leu Gly Val Ala Leu Pro Glu Leu Asp Leu Gly Gly
                245                 250                 255

Gly Tyr Gly Ile Ala Tyr Thr Ala Ala Glu Glu Pro Leu Asn Val Ala
            260                 265                 270

Glu Val Ala Ser Asp Leu Leu Thr Ala Val Gly Lys Met Ala Ala Glu
        275                 280                 285

Leu Gly Ile Asp Ala Pro Thr Val Leu Val Glu Pro Gly Arg Ala Ile
290                 295                 300

Ala Gly Pro Ser Thr Val Thr Ile Tyr Glu Val Gly Thr Thr Lys Asp
305                 310                 315                 320

Val His Val Asp Asp Asp Lys Thr Arg Arg Tyr Ile Ala Val Asp Gly
                325                 330                 335

Gly Met Ser Asp Asn Ile Arg Pro Ala Leu Tyr Gly Ser Glu Tyr Asp
            340                 345                 350

Ala Arg Val Val Ser Arg Phe Ala Glu Gly Asp Pro Val Ser Thr Arg
        355                 360                 365

Ile Val Gly Ser His Cys Glu Ser Gly Asp Ile Leu Ile Asn Asp Glu
370                 375                 380

Ile Tyr Pro Ser Asp Ile Thr Ser Gly Asp Phe Leu Ala Leu Ala Ala
385                 390                 395                 400

Thr Gly Ala Tyr Cys Tyr Ala Met Ser Ser Arg Tyr Asn Ala Phe Thr
                405                 410                 415

Arg Pro Ala Val Val Ser Val Arg Ala Gly Ser Ser Arg Leu Met Leu
            420                 425                 430

```
Arg Arg Glu Thr Leu Asp Asp Ile Leu Ser Leu Glu Ala
        435                 440                 445
```

<210> SEQ ID NO 82
<211> LENGTH: 320
<212> TYPE: PRT
<213> ORGANISM: Artificial Sequence
<220> FEATURE:
<223> OTHER INFORMATION: Synthetic: ddh aa seq.

<400> SEQUENCE: 82

```
Met Thr Asn Ile Arg Val Ala Ile Val Gly Tyr Gly Asn Leu Gly Arg
1               5                   10                  15

Ser Val Glu Lys Leu Ile Ala Lys Gln Pro Asp Met Asp Leu Val Gly
            20                  25                  30

Ile Phe Ser Arg Arg Ala Thr Leu Asp Thr Lys Thr Pro Val Phe Asp
        35                  40                  45

Val Ala Asp Val Asp Lys His Ala Asp Val Asp Val Leu Phe Leu
    50                  55                  60

Cys Met Gly Ser Ala Thr Asp Ile Pro Glu Gln Ala Pro Lys Phe Ala
65                  70                  75                  80

Gln Phe Ala Cys Thr Val Asp Thr Tyr Asp Asn His Arg Asp Ile Pro
                85                  90                  95

Arg His Arg Gln Val Met Asn Glu Ala Ala Thr Ala Ala Gly Asn Val
            100                 105                 110

Ala Leu Val Ser Thr Gly Trp Asp Pro Gly Met Phe Ser Ile Asn Arg
        115                 120                 125

Val Tyr Ala Ala Ala Val Leu Ala Glu His Gln Gln His Thr Phe Trp
130                 135                 140

Gly Pro Gly Leu Ser Gln Gly His Ser Asp Ala Leu Arg Arg Ile Pro
145                 150                 155                 160

Gly Val Gln Lys Ala Val Gln Tyr Thr Leu Pro Ser Glu Asp Ala Leu
                165                 170                 175

Glu Lys Ala Arg Arg Gly Glu Ala Gly Asp Leu Thr Gly Lys Gln Thr
            180                 185                 190

His Lys Arg Gln Cys Phe Val Val Ala Asp Ala Ala Asp His Glu Arg
        195                 200                 205

Ile Glu Asn Asp Ile Arg Thr Met Pro Asp Tyr Phe Val Gly Tyr Glu
    210                 215                 220

Val Glu Val Asn Phe Ile Asp Glu Ala Thr Phe Asp Ser Glu His Thr
225                 230                 235                 240

Gly Met Pro His Gly Gly His Val Ile Thr Thr Gly Asp Thr Gly Gly
                245                 250                 255

Phe Asn His Thr Val Glu Tyr Ile Leu Lys Leu Asp Arg Asn Pro Asp
            260                 265                 270

Phe Thr Ala Ser Ser Gln Ile Ala Phe Gly Arg Ala Ala His Arg Met
        275                 280                 285

Lys Gln Gln Gly Gln Ser Gly Ala Phe Thr Val Leu Glu Val Ala Pro
    290                 295                 300

Tyr Leu Leu Ser Pro Glu Asn Leu Asp Asp Leu Ile Ala Arg Asp Val
305                 310                 315                 320
```